US008081986B2

(12) United States Patent  
Park et al.

(10) Patent No.: US 8,081,986 B2  
(45) Date of Patent: Dec. 20, 2011

(54) METHOD FOR TRANSMITTING LOCATION INFORMATION

(75) Inventors: Eun Young Park, Seoul (KR); Dong Hi Sim, Seoul (KR); Ji Young Huh, Gyeonggi-do (KR); Moon Jeung Joe, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 976 days.

(21) Appl. No.: 11/413,102

(22) Filed: Apr. 28, 2006

(65) Prior Publication Data

US 2006/0246919 A1 Nov. 2, 2006

Related U.S. Application Data

(60) Provisional application No. 60/676,562, filed on Apr. 29, 2005, provisional application No. 60/707,931, filed on Aug. 12, 2005, provisional application No. 60/726,003, filed on Oct. 11, 2005, provisional application No. 60/764,351, filed on Feb. 2, 2006.

(30) Foreign Application Priority Data

Aug. 12, 2005 (KR) .................. 10-2005-0074410  
Apr. 4, 2006 (KR) .................. 10-2006-0030407  
Apr. 6, 2006 (KR) .................. 10-2006-0031659  
Apr. 7, 2006 (KR) .................. 10-2006-0032068

(51) Int. Cl.  
*H04W 24/00* (2009.01)

(52) U.S. Cl. .................. 455/456.1; 455/404.2

(58) Field of Classification Search ....... 455/456.1–457, 455/404.1, 404.2  
See application file for complete search history.

(56) References Cited

U.S. PATENT DOCUMENTS 5,689,809 A * 11/1997 Grube et al. .................. 455/457  
6,167,277 A * 12/2000 Kawamoto .................... 455/457  
(Continued)

FOREIGN PATENT DOCUMENTS

CN 1401082 A 3/2003  
(Continued)

OTHER PUBLICATIONS

3GPP TS 23.271 V7.0.0, "3rd Generation Partnership Project; Technical Specification Group Services and System Aspects; Functional stage 2 description of Location Services (LCS) (Release 7)," 2005.

(Continued)

*Primary Examiner* — Lester Kincaid  
*Assistant Examiner* — Steven Kelley  
(74) *Attorney, Agent, or Firm* — Birch, Stewart, Kolasch & Birch, LLP

(57) ABSTRACT

A method for transmitting location information includes the steps of: a) receiving a start message including MO (mobile originated location request) mode information from a first terminal; b) calculating location information of the first terminal; and c) transmitting the calculated first terminal's location information according to the MO (mobile originated location request) mode information. A method for transmitting location information in a Secure User Plane Location (SUPL) protocol of a first SUPL Enabled Terminal (SET), a SUPL Location Platform (SLP), and a second SUPL Enabled Terminal (SET) includes the steps of: a) receiving a start message including MO (mobile originated location request) mode information from the first SET; b) calculating location information of the first SET; and c) transmitting the calculated first SET's location information to any one of the first SET and the second SET according to the MO (mobile originated location request) mode information.

21 Claims, 27 Drawing Sheets

U.S. PATENT DOCUMENTS

| | | | |
|---|---|---|---|
| 6,823,190 B2 * | 11/2004 | Ford et al. | 455/456.3 |
| 6,885,874 B2 * | 4/2005 | Grube et al. | 455/520 |
| 6,987,976 B2 * | 1/2006 | Kohar et al. | 455/456.1 |
| 6,993,350 B2 * | 1/2006 | Katoh | 455/457 |
| 7,065,348 B1 * | 6/2006 | Aoki | 455/419 |
| 7,116,985 B2 * | 10/2006 | Wilson et al. | 455/456.1 |
| 7,142,872 B2 * | 11/2006 | Park et al. | 455/456.1 |
| 7,526,293 B2 * | 4/2009 | Kim et al. | 455/456.2 |
| 7,616,963 B2 * | 11/2009 | Kim et al. | 455/456.1 |
| 7,822,425 B2 * | 10/2010 | Shim et al. | 455/456.1 |
| 7,917,138 B2 * | 3/2011 | Shim et al. | 455/432.1 |
| 7,925,276 B2 * | 4/2011 | Shim | 455/456.3 |
| 7,966,022 B2 * | 6/2011 | Shim | 455/456.2 |
| 7,970,397 B2 * | 6/2011 | Shim | 455/432.1 |
| 8,000,722 B2 * | 8/2011 | Yan | 455/456.1 |
| 8,019,355 B2 * | 9/2011 | Shim | 455/456.1 |
| 2002/0086683 A1 | 7/2002 | Kohar et al. | |
| 2003/0067993 A1 | 4/2003 | Viswanathan | |
| 2004/0242238 A1 * | 12/2004 | Wang et al. | 455/456.1 |
| 2004/0266453 A1 * | 12/2004 | Maanoja et al. | 455/456.1 |
| 2005/0043038 A1 * | 2/2005 | Maanoja et al. | 455/456.1 |
| 2005/0070306 A1 * | 3/2005 | Kim et al. | 455/456.2 |
| 2005/0153706 A1 * | 7/2005 | Niemenmaa et al. | 455/456.1 |
| 2005/0239480 A1 * | 10/2005 | Kim et al. | 455/456.1 |
| 2005/0250516 A1 * | 11/2005 | Shim | 455/456.1 |
| 2006/0046747 A1 * | 3/2006 | Abraham et al. | 455/456.6 |
| 2006/0225090 A1 * | 10/2006 | Shim et al. | 725/25 |
| 2007/0077939 A1 * | 4/2007 | Uematsu et al. | 455/456.1 |
| 2007/0167177 A1 * | 7/2007 | Kraufvelin | 455/466 |
| 2007/0287411 A1 * | 12/2007 | Kim et al. | 455/404.2 |
| 2008/0174491 A1 * | 7/2008 | Kim et al. | 342/450 |
| 2008/0233931 A1 * | 9/2008 | Shim | 455/414.3 |
| 2010/0093369 A1 * | 4/2010 | Shim | 455/456.1 |
| 2010/0167759 A1 * | 7/2010 | Shim | 455/456.2 |
| 2010/0272480 A1 * | 10/2010 | Kamijo et al. | 399/304 |
| 2010/0273479 A1 * | 10/2010 | Shim | 455/432.1 |
| 2011/0096769 A1 * | 4/2011 | Sim | 370/352 |
| 2011/0171969 A1 * | 7/2011 | Halivaara et al. | 455/456.1 |

FOREIGN PATENT DOCUMENTS

| | | |
|---|---|---|
| JP | 2003-209868 A | 7/2003 |
| KR | 10-2000-004645 A | 7/2000 |
| KR | 10-2004-0041226 A | 5/2004 |
| KR | 10-2005-0004492 A | 1/2005 |
| KR | 10-2005-0027332 A | 3/2005 |
| KR | 10-2006-0025973 A | 3/2006 |
| RU | 2150793 C1 | 6/2000 |
| WO | WO-96/31076 A1 | 10/1996 |
| WO | WO 02/48733 A1 | 6/2002 |
| WO | WO-2004/043106 A1 | 5/2004 |
| WO | WO-2004/080096 A2 | 9/2004 |

OTHER PUBLICATIONS

Open Mobile Alliance: "Secure User Plane Location Architecture Draft Version 1.0", Apr. 19, 2005.

Rouquetts et al., Orthogonal full diversity space—time block coding based on transmit channel state information for 4 Tx antennas, International Conference on Communications ICC 2002, Apr. 28, 2002—Feb. 5, 2002, New York, NY, USA, vol. 1/5 pp. 558-562.

* cited by examiner

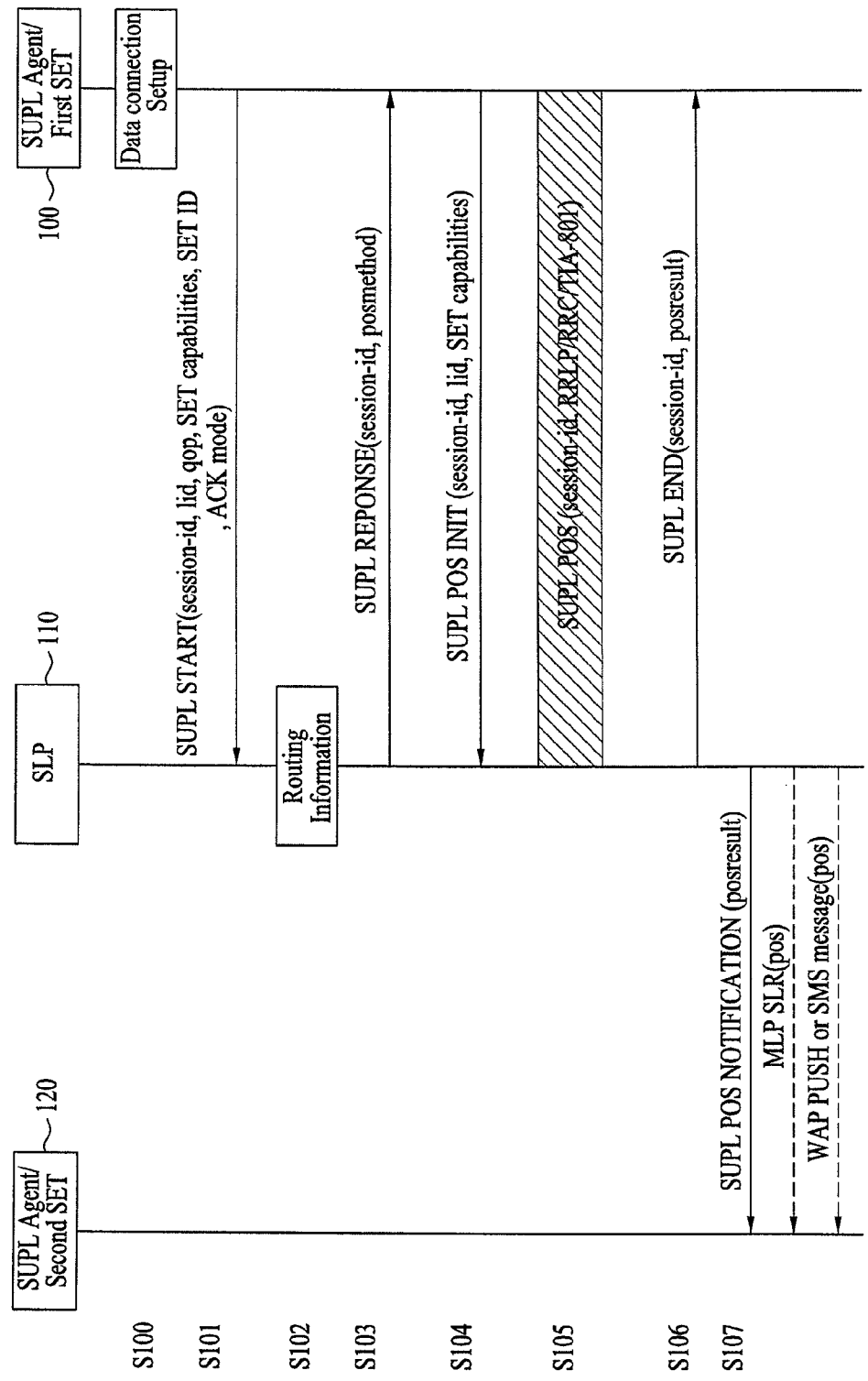

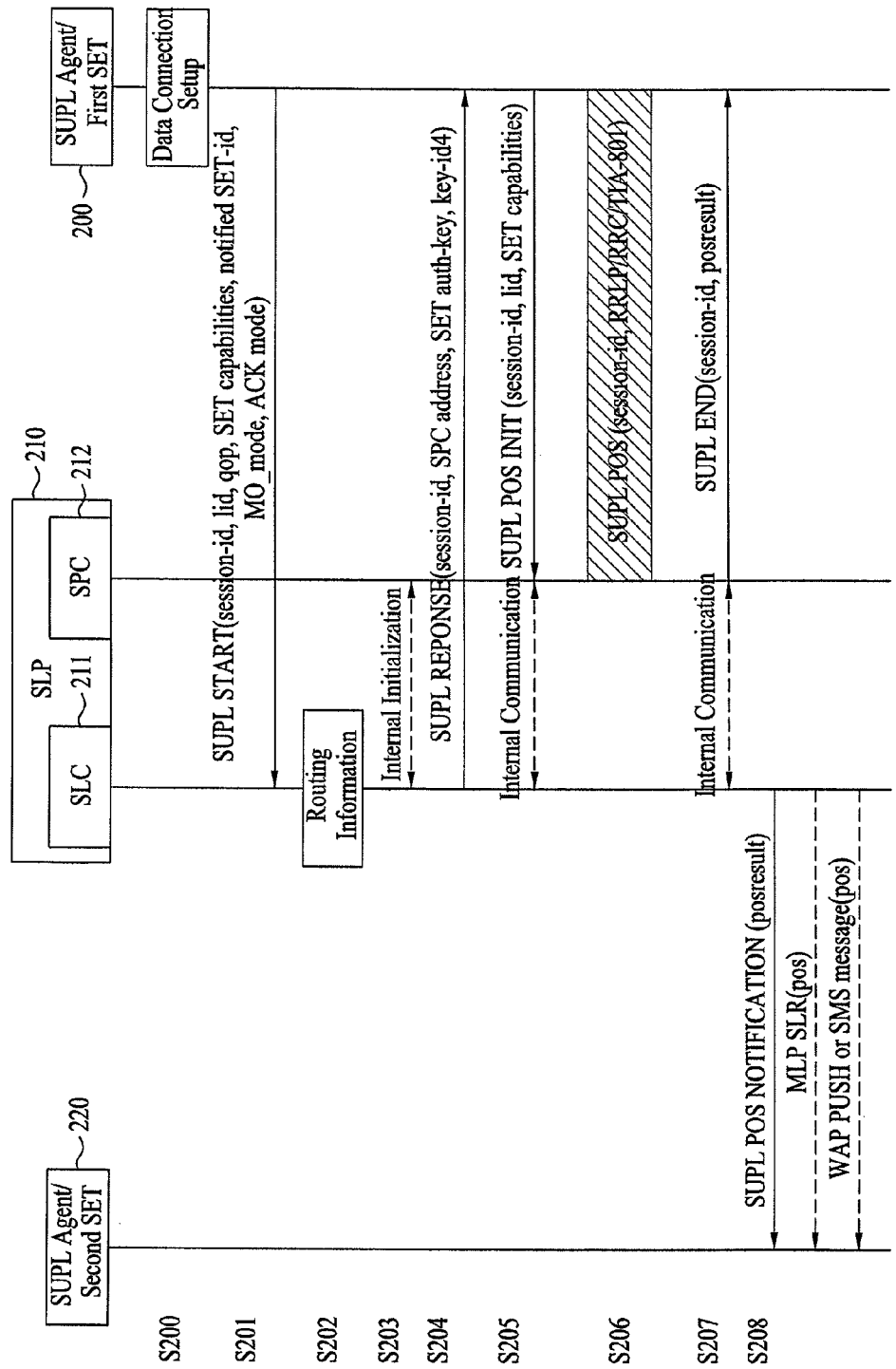

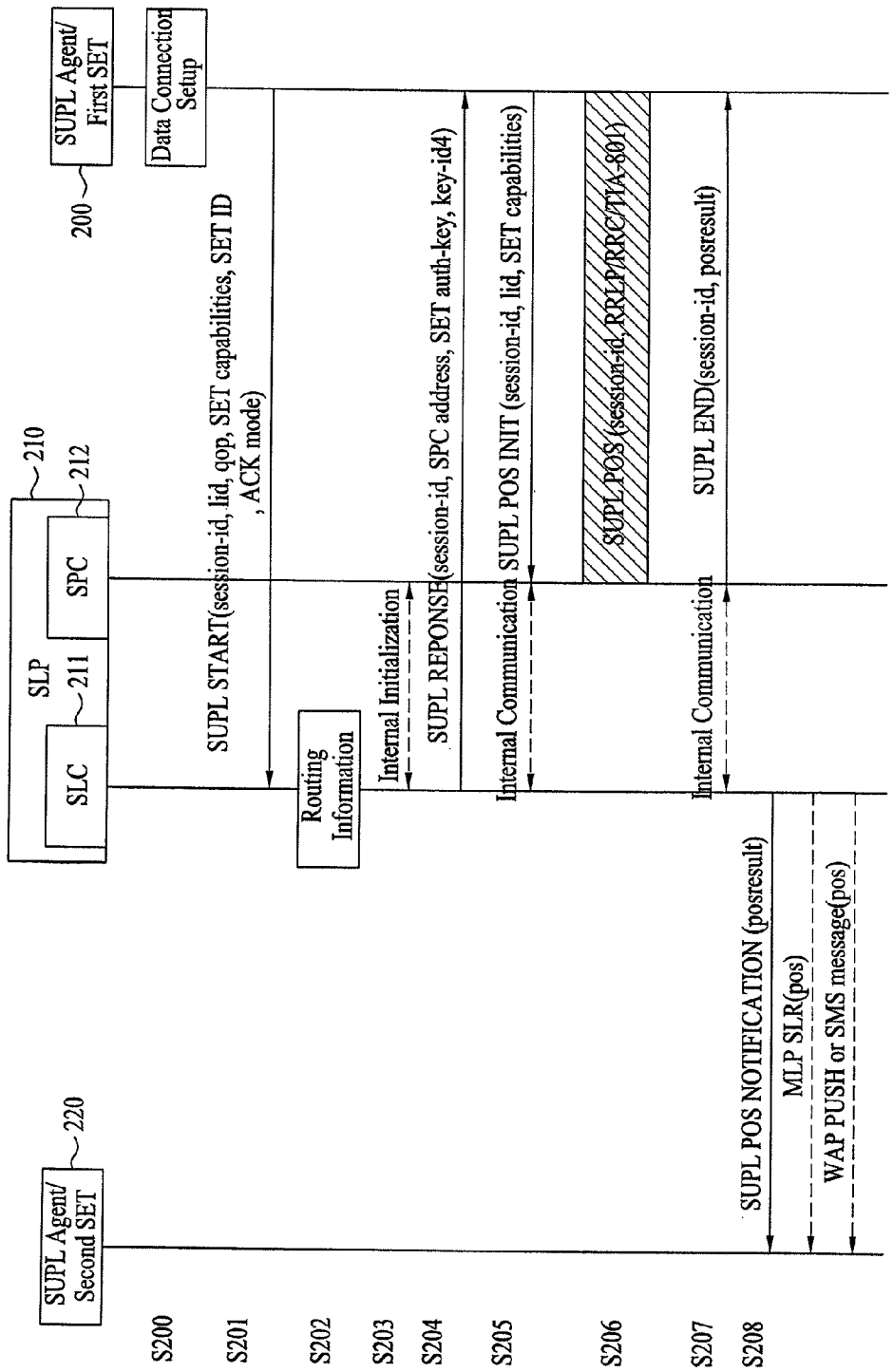

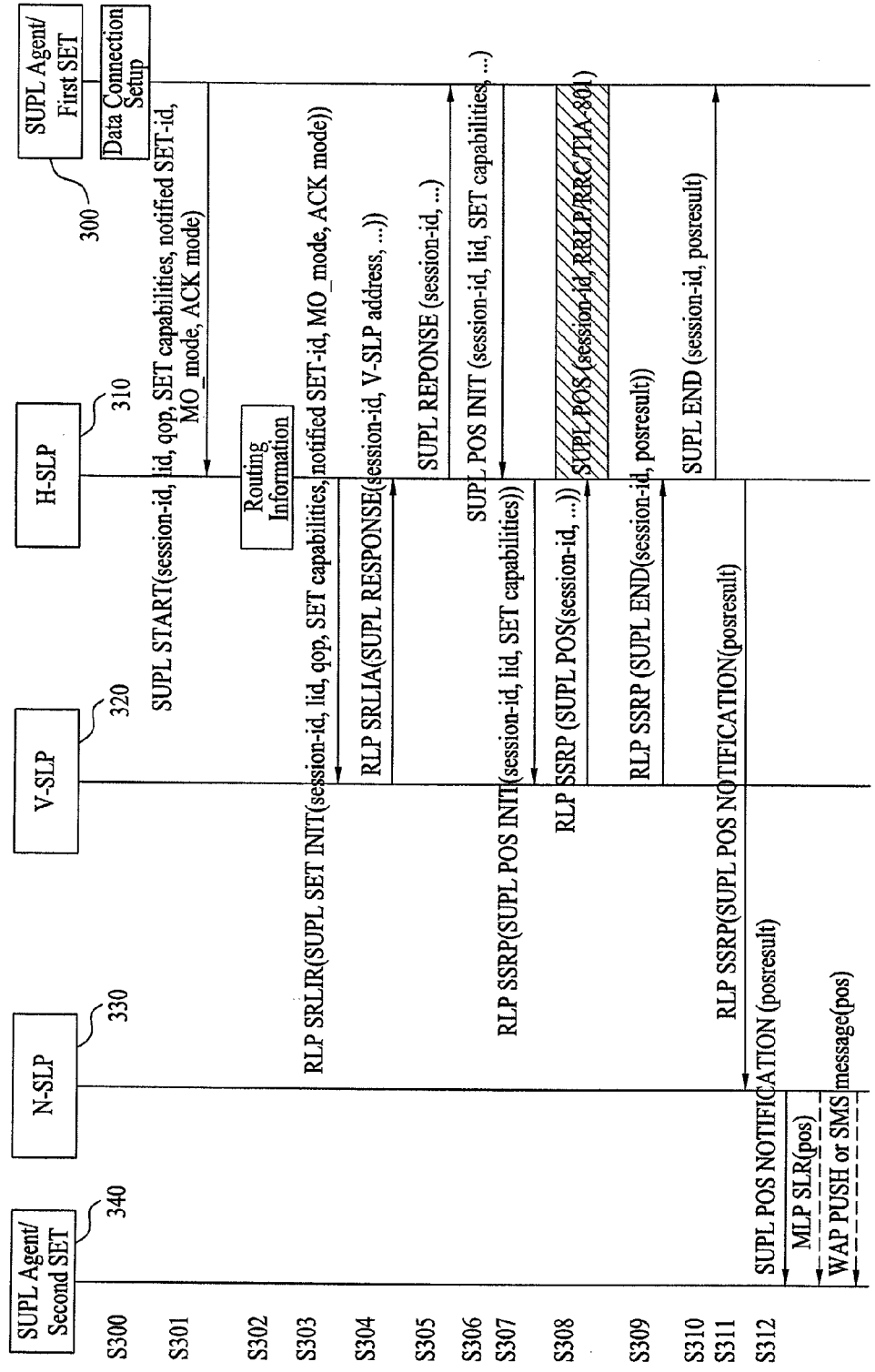

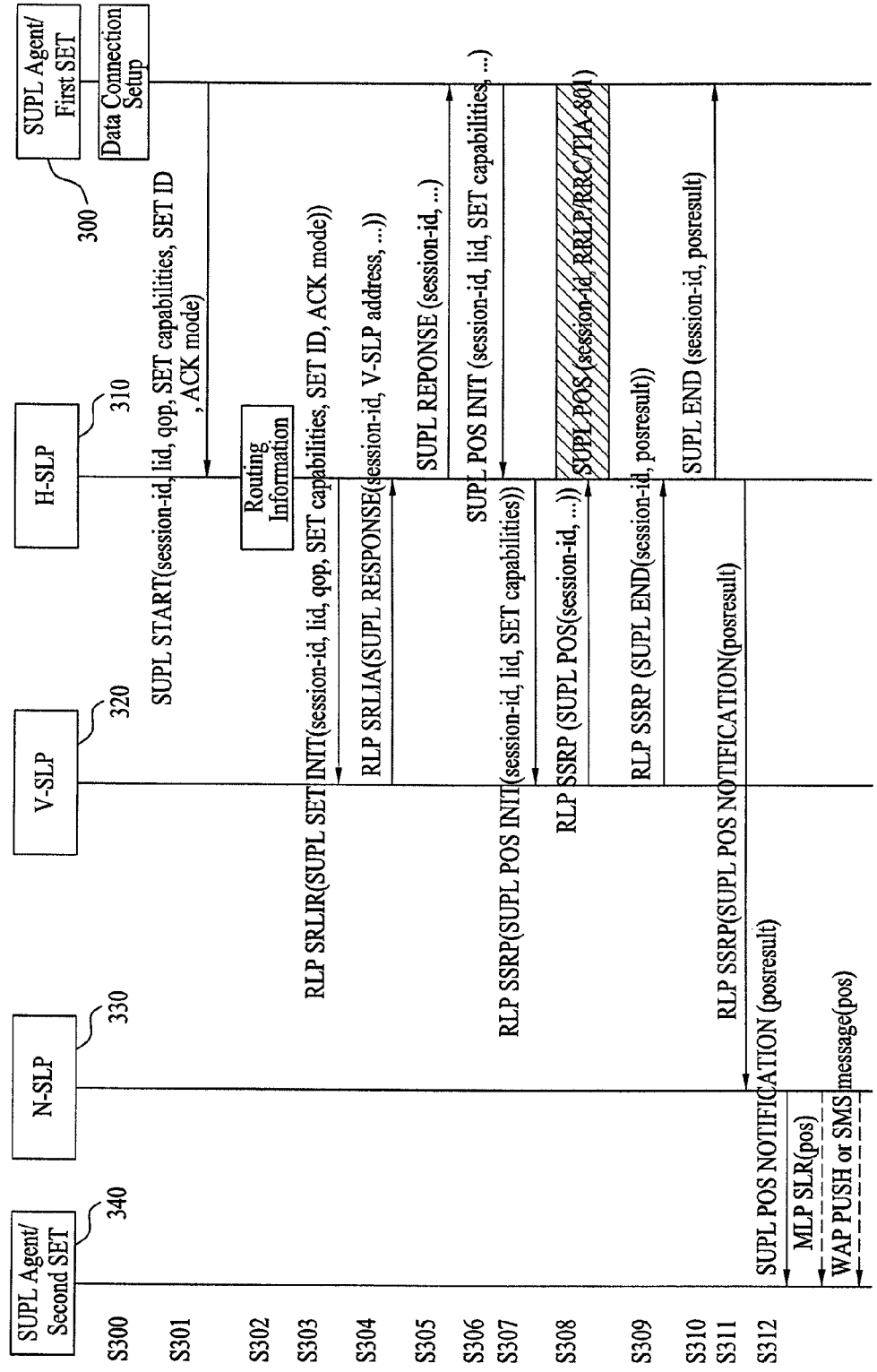

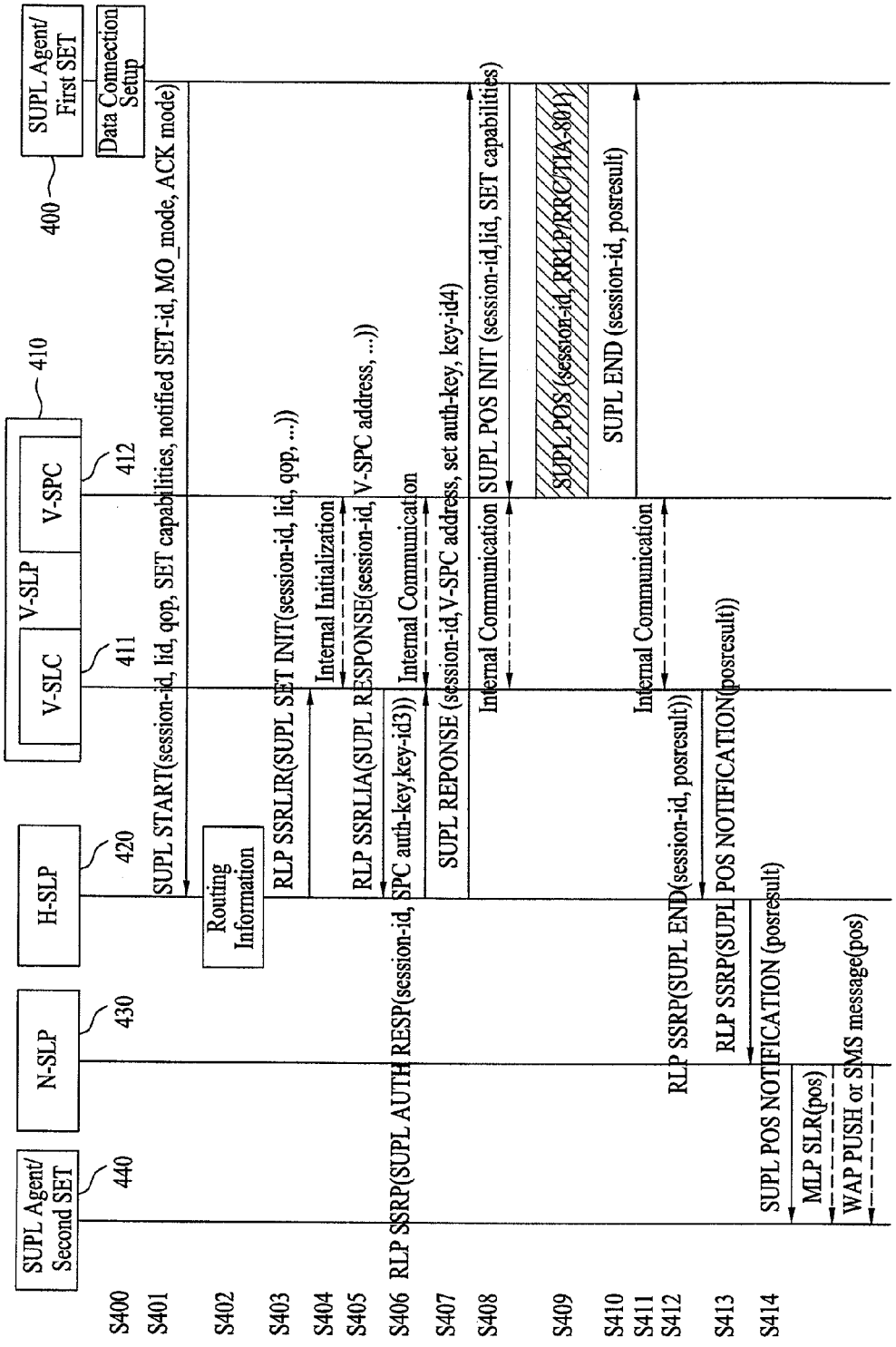

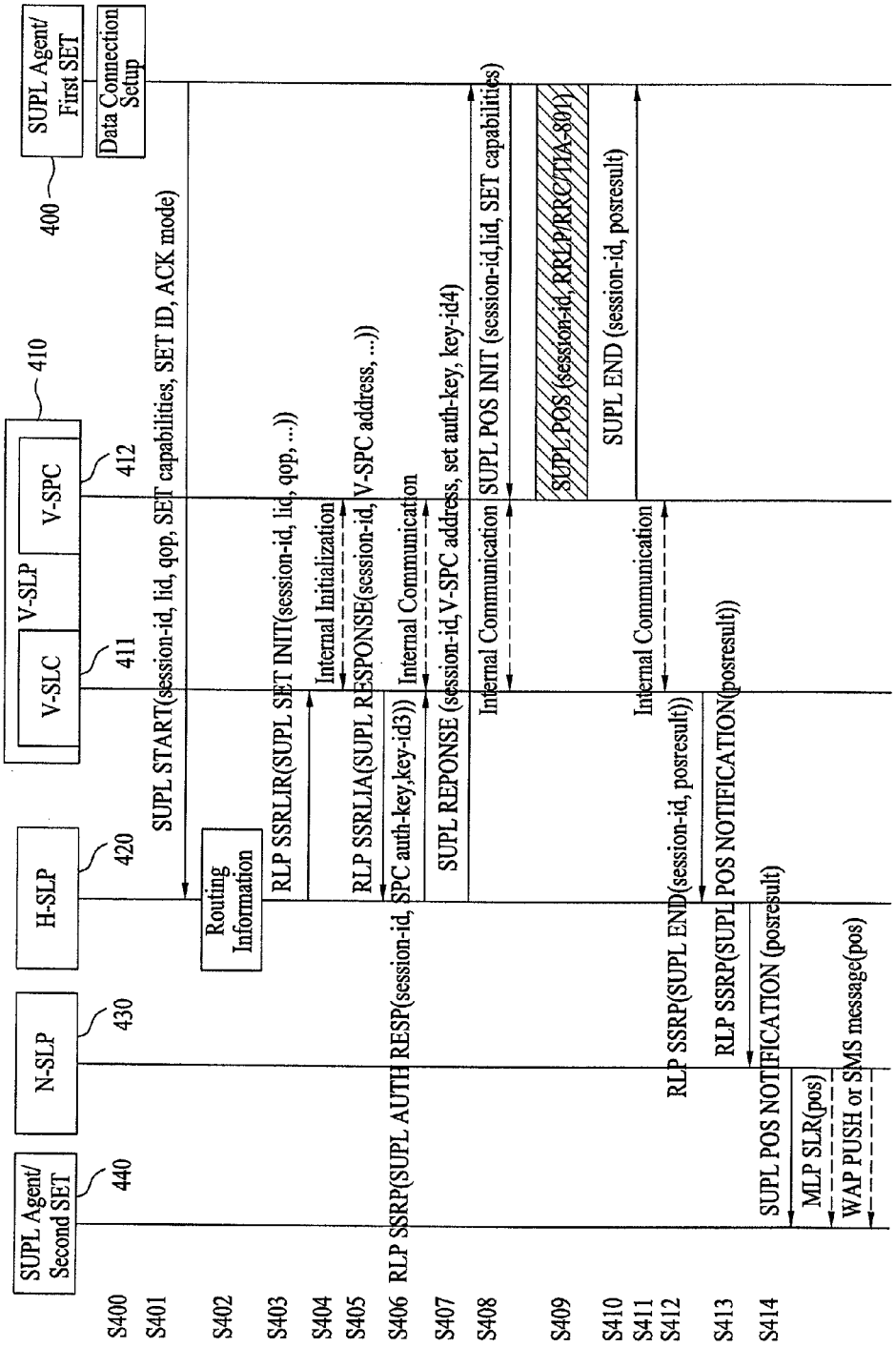

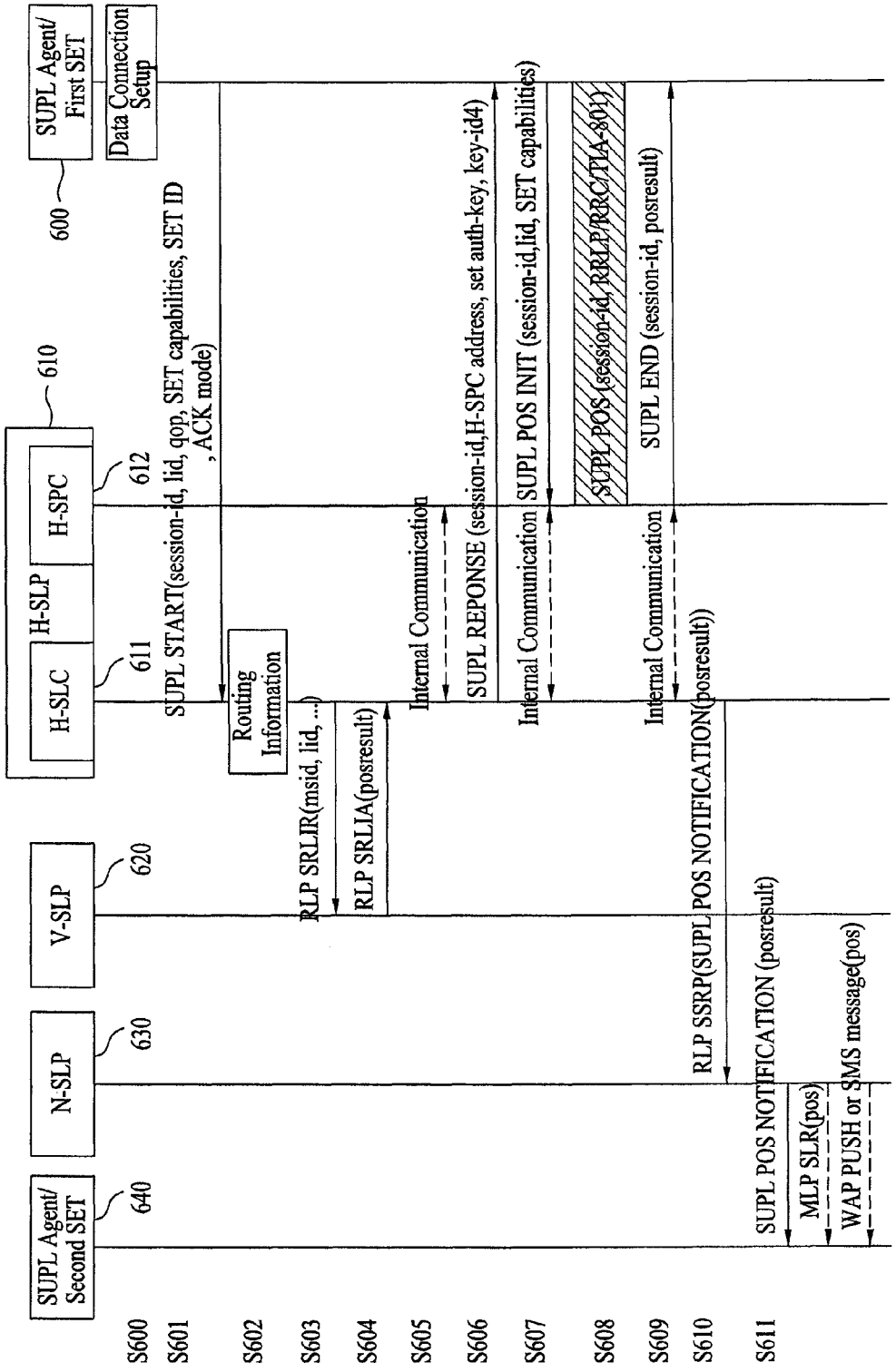

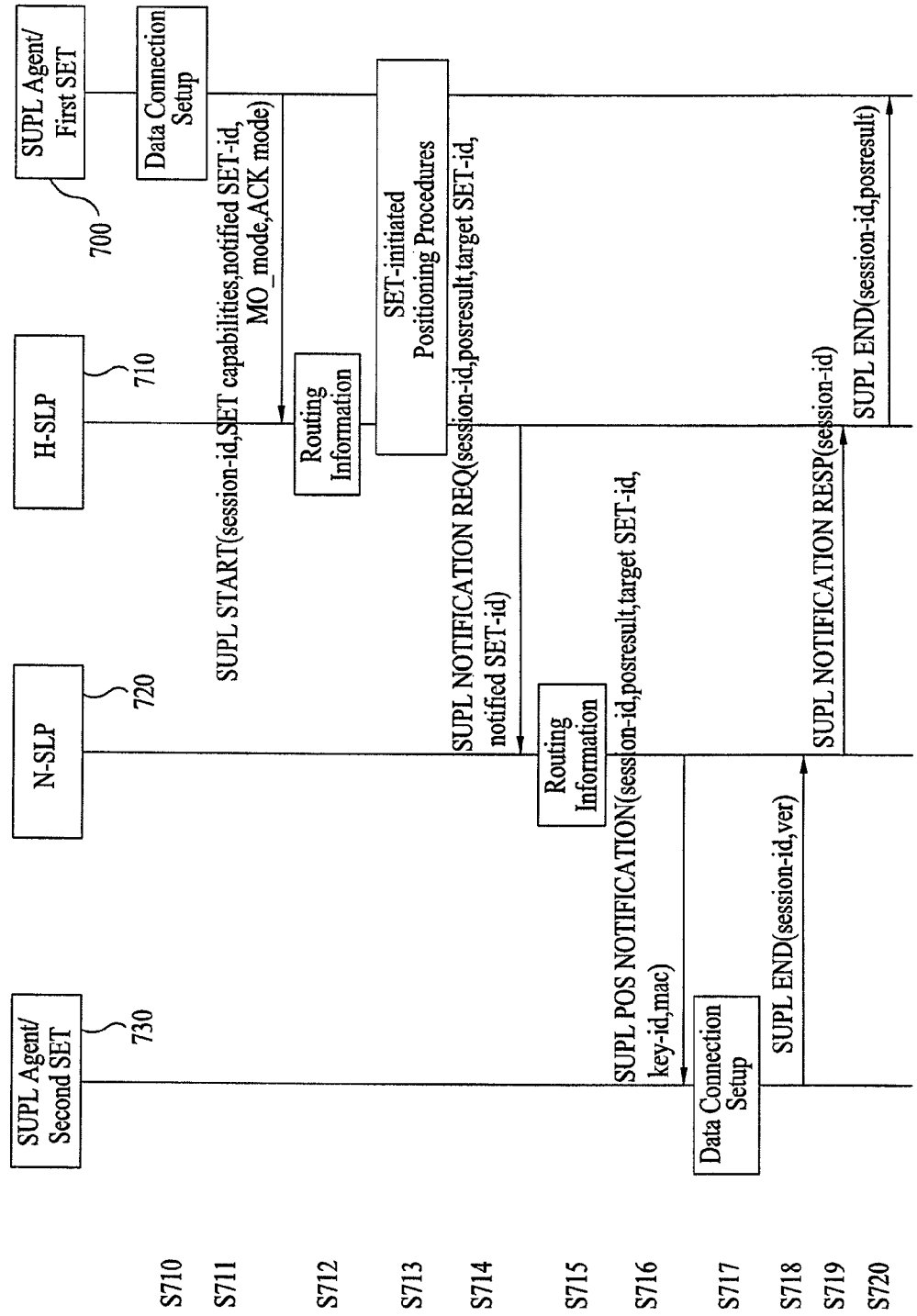

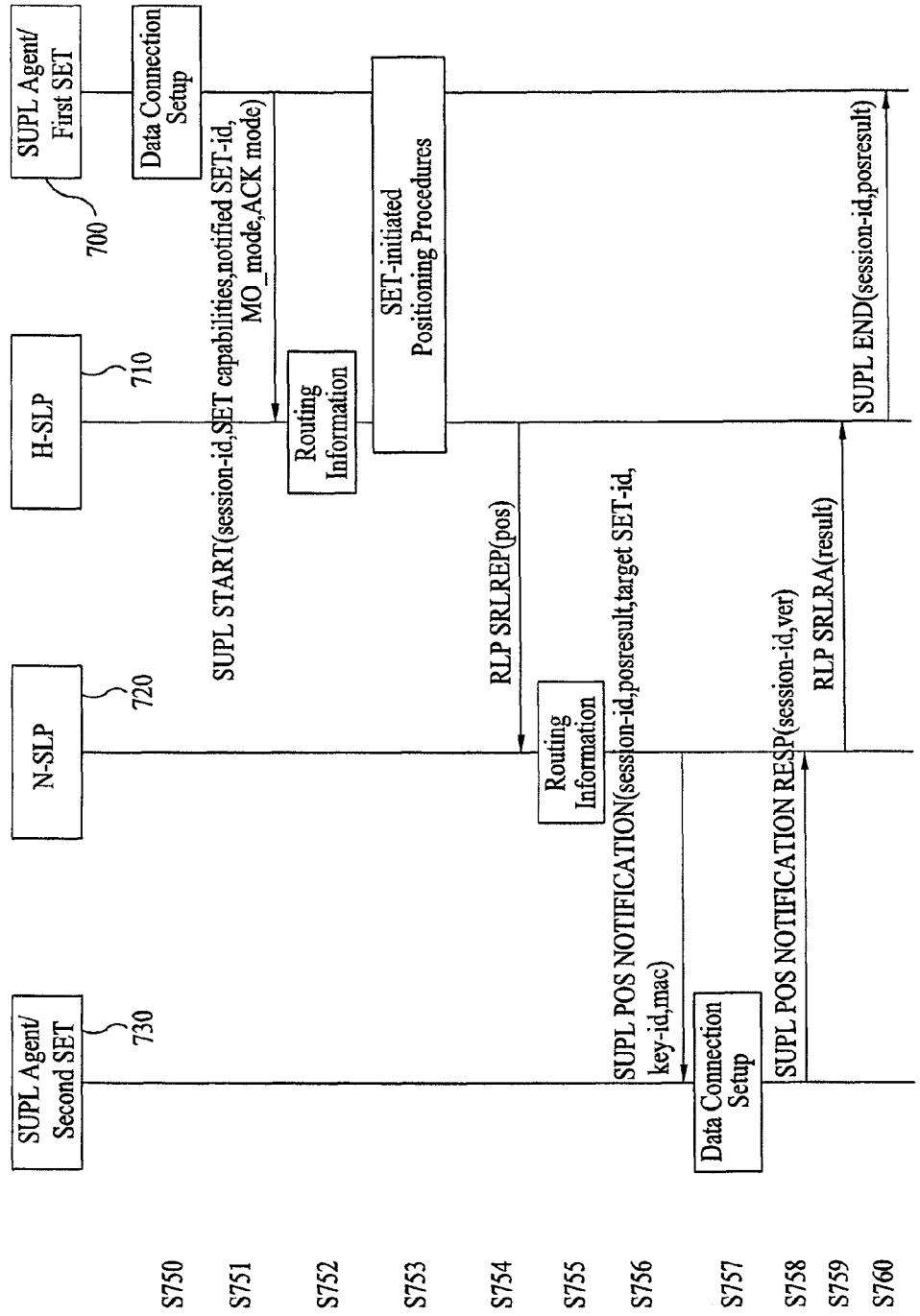

FIG. 9

| Parameter | Presence | Description |
|---|---|---|
| Message Length | M | The length of the entire ULP Message in octets.<br>Note: The first two octets of a PER encoded ULP message contains the length of the entire message. These octets are set to the Message Length when the PER encoding is complete and the entire message length is known. |
| Version | M | Version of the ULP protocol, in the form major, minor, service indicator. |
| Session ID | M | The unique Session ID |
| Message Payload | M | This parameter contains one of the messages defined in ULP.<br>Defined messages are:<br><br>• SUPL INIT<br>• SUPL START<br>• SUPL RESPONSE<br>• SUPL POS INIT<br>• SUPL POS<br>• SUPL END<br>• SUPL AUTH REQ<br>• SUPL AUTH RESP<br>• SUPL POS NOTIFICATION |

FIG. 10

| Parameter | Presence | Description |
|---|---|---|
| Positioning Method | M | Defines the positioning technologies desired by the SLP, which can be AGPS SET assisted, AGPS SET Based, Autonomous GPS, EOTD, OTDOA, AFLT or Enhanced Cell ID. |
| Notification | O | The purpose of this field is to provide instructions to the SET with respect to LCS notification and privacy |
| Session ID | CV | This parameter contains an SLP address (SPC address for non-proxy mode.)<br><br>For proxy mode this parameter is OPTIONAL.<br><br>For non-proxy mode this parameter is REQUIRED.<br><br>This address is used by the SET when establishing a secure IP connection to the SLP or SPC |
| QoP | O | Desired Quality of Position. |
| SLP Mode | M | This parameter indicates if the SLP uses proxy or non-proxy mode. |
| MAC | O | This parameter contains a Message Authentication Code(MAC), which MAY be used as integrity protection of the SUPL INIT message. |
| Key Identity | CV | This parameter contains a key identity, which identifies the key to be used to verify the MAC. It is required when MAC is present. |

FIG. 11A

| Parameter | Presence | Description |
|---|---|---|
| SET capabilities | M | Defines the capabilities of the SET |
| Location Id | M | Defines the cell information of the SET. |
| QoP | O | Desired Quality of Position |
| Notified SET Id | O | Notified SET identity value |
| MO Mode | - | Describes the mode that the SET Initiated location request uses.<br>This parameter can be of type<br>• Type 1(Transfer to the request SET)<br>• Type 2(Transfer to the third party) |
| ACK Mode | - | Describes the mode that the acknowledgement of transfer of a position of target SET to the third party uses.<br>This parameter can be of type<br>• Acknowledgement required<br>• Acknowledgement not required |

FIG. 11B

| Parameter | Presence | Description |
|---|---|---|
| SET capabilities | M | Defines the capabilities of the SET |
| Location Id | M | Defines the cell information of the SET. |
| QoP | O | Desired Quality of Position |
| SET ID | M | The following SET IDs are supported<br>• Target SET ID<br>• Third Party ID<br>Target SET ID identifies the Target SET to be located where a SET can initiate location request to another target SET.<br><br>Third Party ID identifies the Third Party where a SET can initiate location request for the transfer of a position of the SET |
| Ack Mode | M | Describes the mode that the acknowledgement of target SET to the third party uses. |

FIG. 11C

| Parameter | Presence | Description |
|---|---|---|
| SET ID | – | SET ID can be:<br><br>SETtoSET:<br><br>Target SET ID<br><br>In case of SETtoSET, SET ID identifies the Target SET to be located where a SET can initiate location request to another target SET.<br><br>SETtoThirdParty:<br><br>Third Party ID<br><br>In case of SETtoThirdParty, SET ID identifies the Third Party name where a SET can initiate location request for the transfer of a position of the SET |

SET ID Parameter

| Parameter | Presence | Description |
|---|---|---|
| Target SET ID | – | Identifies the Target SET to be located where a SET can initiate location request to another target SET |

Target SET ID Parameter

| Parameter | Presence | Description |
|---|---|---|
| Third Party ID | – | Identifies the Third Party ID |
| >Third Party Name | M | Identifies the Third Party name where a SET can initiate location request for the transfer of a position of the SET |
| >Third Party Name Type | M | Indicates the type of the third party name. The type of the third party name can be one of the following:<br>- Logical name<br>- MSISDN<br>- E-mail address<br>- URL<br>- SIP URL<br>- IMS public identity<br>- MIN<br>- MDN |

Third Party ID Parameter

FIG. 12

| Parameter | Presence | Description |
|---|---|---|
| Positioning Method | M | The positioning method desired for the SUPL POS session |
| SLP Address | CV | This parameter is only required for non-proxy mode and contains an SPC address.<br>A SET uses this address to establish a data connection to the SPC |
| SET Auth key | CV | This parameter is only required for non-proxy mode and contains the authentication key that a SET SHALL use for SPC authentication |
| Key Identity 4 | CV | This parameter is only required for non-proxy mode and contains a key indentity |

FIG. 13

| Parameter | Presence | Description |
|---|---|---|
| SET Capabilities | M | Defines the capabilities of the SET. |
| Request Assistance Data | M | Defines the requested GPS assistance data. The presence of this element indicates that the SET wants to obtain assistance data from the SLP. In the case of RRLP and SET based location determination in the SET initiated case, the SLP SHALL send the RRLP Assistance Data message. The SET SHALL acknowledge the receptiono of assistance data with an RRLP Assistance Data ACK.<br><br>In the case of RRC and SET based location determination in the SET initiated case, the SLP SHALL send the RRC Assistance Data Delivery message.<br><br>The Requested Assistance Data parameter is not applicable to TIA-801 [C.S0022-A v1.0]. |
| Location ID | M | Defines the cell information of the SET. |
| Position | O | Defines the position of the SET. |
| SUPLPOS | O | Contains SUPL POS message.<br><br>Note:is only used if positioning protocol allows SET to send first message. |
| Ver | CV | This parameter contain s a hash of the SUPL INIT message. In Network initiated proxy mode a SET SHALL calculate a hash of a received SUPL INIT and include the result of the hash in this parameter. |

FIG. 14

| Parameter | Presence | Description |
|---|---|---|
| Positioning Payload | M | The underlying TIA-801, RRLP or RRC element |
| Velocity | | Velocity of the SET, needed to overcome the lack of this information in RRLP and RRC. Defined in [3GPPGAD] |

FIG. 15

| Parameter | Presence | Description |
|---|---|---|
| Position | O | Defines the position result of the SET. |
| Status Code | O | Defines the Status of the message as either an error indication or an information indication.<br><br>Error indications have values between 0 and 99, information indications have values between 100 and 199. |
| Ver | CV | This parameter contains a hash of the SUPL INIT message and is caculated by the SET. This parameter MUST be present in situations where the SUPL END message is sent as a direct response to SUPL INIT (both proxy and non-proxy mode). |

FIG. 16

| Parameter | Presence | Description |
|---|---|---|
| SPC Auth key | O | This parameter defines the authentication key that a SET SHALL use for SPC authentication |
| Key Identity 3 | CV | This parameter contains a key identity. It is required if SPC Auth Key is present. |
| Status Code | O | Defines the Status of the message as either an error indication or an information indication<br><br>Error indications have values between 0 and 99, information indications have values between 100 and 199.<br><br>SUPL AUTH RESP uses the Status Code parameter to indicate authentication failure (authNetFailure). If the SLC sends authNetFailure back to the SET, the session is considered closed and will be terminated by both sides. |

FIG. 17

| Parameter | Presence | Description |
|---|---|---|
| Position | M | Defines the position result of the Target SET. |
| Target SET Id | M | Target SET identity value |

METHOD FOR TRANSMITTING LOCATION INFORMATION

This application claims the benefit of Korean Patent Application No. 10-2005-0074410, filed on Aug. 12, 2005, No. 10-2006-0030407, filed on Apr. 4, 2006, No. 10-2006-0031659, filed on Apr. 6, 2006, and No. 10-2006-0032068, filed on Apr. 7, 2006, which are hereby incorporated by reference as if fully set forth herein.

This application claims the benefit of U.S. Provisional Application No. 60/676,562, filed on Apr. 29, 2005, in the name of inventors Eun Young PARK and Ji Young HUH, entitled "Method for Transmitting the Location Information Based on SUPL", No. 60/707,931, filed on Aug. 12, 2005, in the name of inventors Eun Young PARK, Ji Young HUH and Dong Hi SIM, entitled "Method for transmitting the location information based on SUPL", No. 60/726,003, filed on Oct. 11, 2005, in the name of inventors Eun Young PARK, Ji Young HUH and Dong Hi SIM, entitled "Method for transmitting the location information based on SUPL", and No. 60/764,351, filed on Feb. 2, 2006, in the name of inventors Eun Young PARK, Ji Young HUH and Dong Hi SIM, entitled "Initiated location request of transfer the location to the third party", which are hereby incorporated by reference as if fully set forth herein.

BACKGROUND OF THE INVENTION

1. Field of the Invention

The present invention relates to a method for transmitting location information of a mobile communication terminal, and more particularly to a method for effectively transmitting location information, such that it allows a specific terminal to acquire its location information using a location information service, or allows the specific terminal to transmit its location information to another terminal.

2. Discussion of the Related Art

Generally, a mobile communication system provides a Location Based Service (LBS) capable of recognizing terminal location information based on a mobile communication network, and employing the recognized terminal location information. For example, a service (also called a positioning service) for tracking a human location or an object location, a vehicle navigation service, and an emergency rescue service, etc., have been widely used as the above-mentioned LBS.

A current mobile communication system generally provides the above-mentioned LBS service via a control plane of a network system. However, the LBS service implemented via the control plane of the network system employs different positioning-signaling functions and different positioning systems according to network structures (e.g., a 3GPP (3rd Generation Partnership Project) and a 3GPP2 (3rd Generation Partnership Project 2).

Therefore, in order to update the service or introduce a new positioning method into the network, the above-mentioned mobile communication system must update or newly introduce all network components, that should be changed to others because a signaling and a protocol of the control plane have been changed, resulting in greater inconvenience of use.

A User Plane Protocol capable of enabling a User Plane to provide a location information service has been defined to solve the above-mentioned problems.

The User Plane Protocol has been designed to transmit specific information required for the positioning service using the User Plane, such that it is independent of the network structure. Also, the User Plane Protocol need not update all network components of the positioning system on the condition that the service is updated or a new positioning method is introduced.

However, the above-mentioned User Plane Protocol does not describe a method for allowing a specific terminal to receive its location information or a method for allowing the specific terminal to transmit its location information to another terminal, such that unexpected problems occur in a positioning process.

SUMMARY OF THE INVENTION

Accordingly, the present invention is directed to a method for transmitting location information that substantially obviates one or more problems due to limitations and disadvantages of the related art.

An object of the present invention is to provide a method for effectively transmitting location information, such that it allows a specific terminal to acquire its location information using a location information service, or allows the specific terminal to transmit its location information to another terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting location information comprises the steps of: a) receiving a start message including MO (mobile originated location request) mode information from a first terminal; b) calculating location information of the first terminal; and c) transmitting the calculated first terminal's location information according to the MO (mobile originated location request) mode information.

In another aspect of the present invention, there is provided a method for transmitting location information in a Secure User Plane Location (SUPL) protocol of a first SUPL Enabled Terminal (SET), a SUPL Location Platform (SLP), and a second SUPL Enabled Terminal (SET), the method comprising the steps of: a) receiving a start message including MO (mobile originated location request) mode information from the first SET; b) calculating location information of the first SET; and c) transmitting the calculated first SET's location information to any one of the first SET and the second SET according to the MO (mobile originated location request) mode information.

In yet another aspect of the present invention, there is provided a method for transmitting location information comprising the steps of: a) transmitting a start message including MO (mobile originated location request) mode information; and b) if the MO (mobile originated location request) mode information indicates that the first terminal desires to receive its location information, receiving the first terminal's location information.

In yet another aspect of the present invention, there is provided a method for transmitting location information in a communication environment including a first terminal, a second terminal, a home server (H-server), and a Visited Server (V-server), the method comprising the steps of: a) transmitting, by the first terminal, a start message to the home server so as to initiate a positioning process; b) performing, by the home server, a positioning of the first terminal via the visited server; c) calculating location information of the first terminal, and transmitting the calculated first terminal's location information to the home server; and d) transmitting, by the home server, the first terminal's location information to the second terminal.

In yet another aspect of the present invention, there is provided a method for transmitting location information in a communication environment including a first terminal, a second terminal, a home server (H-server), and a Visited Server (V-server), the method comprising the steps of: a) transmitting, by the first terminal, a start message to the home server so as to initiate a positioning process; b) performing a positioning process between the home server receiving the start message and the first terminal, and calculating location information of the first terminal; and c) transmitting the first terminal's location information to the second terminal.

In yet another aspect of the present invention, there is provided a method for transmitting location information in a communication environment including a first terminal, a second terminal, a home server (H-server), and a notified Server (N-server), the method comprising the steps of: a) receiving, by the home server, a start message to initiate a positioning process; b) performing a positioning process between the home server receiving the start message and the first terminal, acquiring ocation information of the first terminal, and transmitting the acquired first terminal's location information to the notified server; and c) transmitting, by the notified server, the first terminal's location information to the second terminal.

In yet another aspect of the present invention, there is provided a method for transmitting location information comprising the steps of: a) receiving location information of a first terminal and ACK mode information; and b) if the ACK mode information indicates that there is a need to output an acknowledgement signal indicating reception of the first terminal's location information, transmitting the acknowledgement signal to the first terminal.

In yet another aspect of the present invention, there is provided a method for transmitting location information comprising the steps of: a) receiving a start message including SET (SUPL Enabled Terminal) ID (Identifier) information from a first terminal; b) calculating location information of the first terminal; and c) transmitting the calculated first terminal's location information to a second terminal according to the SET ID information.

In yet another aspect of the present invention, there is provided a method for transmitting location information comprising the steps of: a) receiving a start message including SET (SUPL Enabled Terminal) ID (Identifier) information from a first terminal; b) calculating location information of a second terminal according to the SET ID information; and c) transmitting the calculated second terminal's location information to the first terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1B is a conceptual diagram illustrating a method for transmitting location information according to a second preferred embodiment of the present invention;

FIG. 2A is a conceptual diagram illustrating a method for transmitting location information according to a third preferred embodiment of the present invention;

FIG. 2B is a conceptual diagram illustrating a method for transmitting location information according to a fourth preferred embodiment of the present invention;

FIG. 3A is a conceptual diagram illustrating a method for transmitting location information according to a fifth preferred embodiment of the present invention;

FIG. 3B is a conceptual diagram illustrating a method for transmitting location information according to a sixth preferred embodiment of the present invention;

FIG. 4A is a conceptual diagram illustrating a method for transmitting location information according to a seventh preferred embodiment of the present invention;

FIG. 4B is a conceptual diagram illustrating a method for transmitting location information according to am eighth preferred embodiment of the present invention;

FIG. 6B is a conceptual diagram illustrating a method for transmitting location information according to a 12-th preferred embodiment of the present invention;

FIGS. 7A~7C are conceptual diagrams illustrating a method for transmitting location information according to a 13-th preferred embodiment of the present invention;

FIG. 9 exemplarily shows a common part commonly contained in transmission/reception messages communicated between a terminal and a server in the case of a method for transmitting location information according to the present invention;

FIG. 10 exemplarily shows an initialization message (SUPL INIT) according to the present invention;

FIG. 11A shows a first preferred embodiment of a start message (SUPL START) according to the present invention;

FIG. 11B shows a second preferred embodiment of a start message (SUPL START) according to the present invention;

FIG. 11C exemplarily shows parameters of the start message (SUPL START) according to the present invention;

FIG. 12 exemplarily shows a response message (SUPL RESPONSE) according to the present invention;

FIG. 13 exemplarily shows a positioning initialization message (SUPL POS INIT) according to the present invention;

FIG. 14 exemplarily shows a positioning message (SUPL POS) according to the present invention;

FIG. 15 exemplarily shows an end message (SUPL END) according to the present invention;

FIG. 16 exemplarily shows an authentication response message (SUPL AUTH RESP) according to the present invention; and FIG. 17 exemplarily shows a positioning notification message (SUPL POS NOTIFICATION) according to the present invention.

DETAILED DESCRIPTION OF THE INVENTION

Figure 1A:
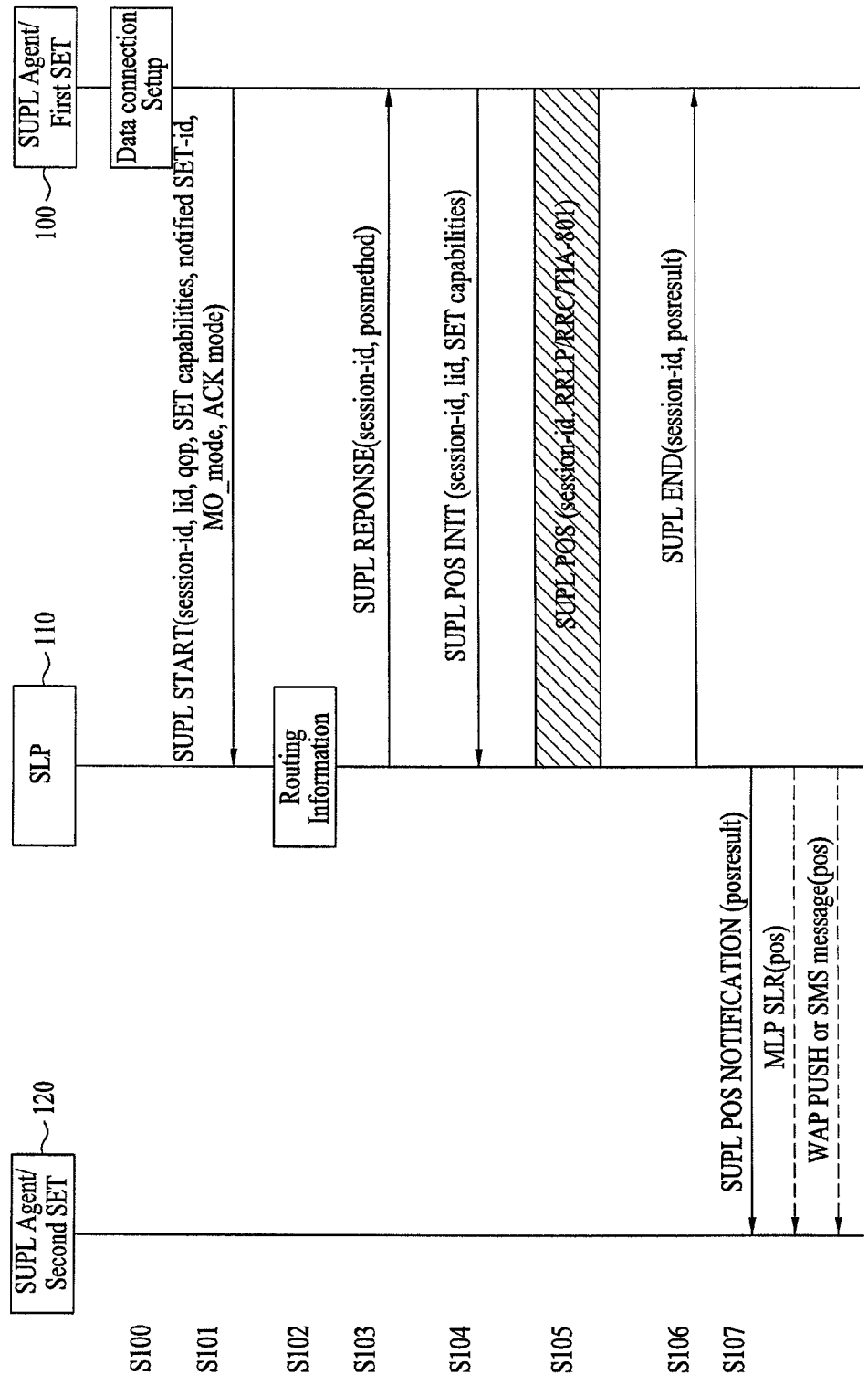
FIG. 1A is a conceptual diagram illustrating a method for transmitting location information according to a first preferred embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

The term "Protocol" according to the present invention is indicative of a communication protocol. The term "User Plane Protocol" is indicative of a protocol for use in a User Plane. A representative example of the User Plane Protocol is a Secure User Plane Location Protocol. The Secure User Plane Location Protocol is indicative of a protocol for providing a location information service in a User Plane.

For the convenience of description and better understanding of the present invention, a Secure User Plane Location (SUPL) protocol will be exemplarily used as the User Plane Location Protocol in the present invention, but technical ideas of the present invention are not limited to only the SUPL protocol.

The term "Terminal" is indicative of Input/Output (I/O) points of information transmitted/received to/from a communication network, a device for constructing/viewing data in a digital data transmission system, or a device for performing data transmission/reception functions.

For the convenience of description and better understanding of the present invention, a SUPL Enabled Terminal (SET) capable of enabling the User Plane Location Protocol will hereinafter be exemplarily used as the above-mentioned terminal. The terminal for the User Plane Location Protocol may also be called a SUPL Agent as necessary.

For example, if a specific terminal requests its location information or designs to transmit the location information to another terminal, the specific terminal is defined as a first terminal, and a Target SUPL Enabled Terminal (hereinafter referred to as a first SET) will be used as a preferred embodiment of the first terminal. If another terminal is desired by the first terminal as a destination at which the location information of the first terminal is to be received, the desired terminal is defined as a second terminal, and a Notified SUPL Enabled Terminal (hereinafter referred to as a second SET) will be used as an example of the second terminal.

However, it should be noted that technical ideas of the present invention can also be applied to other terminals without departing from the scope and spirit of the invention. In association with the above-mentioned description, the first SET may also be denoted by a Target SET, and the second SET may also be denoted by a Notified SET.

The term "Server" is indicative of a device or program for operating a management software program, which allows other terminals contained in a communication network to access all or some parts of the communication network, and controls access to resources of the communication network. The server may include a location calculator for calculating location information of a specific terminal; and a server manager for performing overall protocol management using the server.

In this case, in association with the present invention, a SUPL Location Platform (SLP) is used as an example of the server, a SUPL Position Center (SPC) is used as an example of the location calculator, and a SUPL Location Center (SLC) is used as an example of the server manager. However, it should be noted that the present invention can also be applied to other servers as necessary.

In association with the present invention, a specific network in which the terminal has been initially registered or joined is called a Home Network (HN). If the terminal moves to other location and gains access to a specific network instead of the HN, the specific network is referred to as a Visited Network (VN).

A server contained in the HN is called a Home Server or a H-Server. A server contained in the VN is called a Visited Server or a V-Server. A server contained in a network including the second terminal for receiving location information is called a Notified Server or a N-Server.

In this case, in association with the present invention, a Home SLP (H-SLP) is used as an example of the H-Server, a Visited SLP (V-SLP) is used as an example of the V-Server, and a Notified SLP (N-SLP) is used as an example of the N-SLP. However, it should be noted that the scope of the present invention is not limited to the aforementioned examples, and the N-SLP acting as a logical entity may be identical with the H-SLP.

A first case in which a terminal is located at the HN is called a Non-Roaming Successful Case. A second case in which a terminal is located at the VN is called a Roaming Successful Case. A third case in which a terminal calculates location information by communicating with the location calculator via the server manager is called a Proxy Mode. A fourth case in which a terminal calculates location information by directly communicating with the location calculator is called a Non-Proxy Mode.

For example, in the case where the first SET is located at the HN, this case is considered to be the Non-Roaming Successful Case. In the case where the first SET is located at the VN, this case is considered to be the Roaming Successful Case. In the case where the first SET calculates location information by communicating with the SPC acting as the location calculator via the SLC acting as the server manager, this case is considered to be the Proxy Mode. In the case where the first SET calculates location information by directly communicating with the SPC acting as the location calculator, this case is considered to be the Non-Proxy Mode.

However, it is obvious to those skilled in the art that the present invention is applicable to the Non-Roaming Successful Case and the Roaming Successful Case irrespective of a roaming state, and the server can be applied to the Proxy Mode and the Non-Proxy Mode.

The term "Message" is indicative of a single transmission unit, is configured according to a strict rule, and is indicative of a transmission unit according to a protocol acting as a predetermined rule between a transmitter and a receiver. For example, a User Plane Location Protocol (ULP) Message is indicative of a data transmission unit according to the SUPL protocol.

There are a variety of ULP messages, for example, an initialization message, a start message, a response message, a positioning-initialization message, a positioning message, an end message, an authentication response message, and a positioning notification message.

The initialization message is indicative of a message firstly transmitted from the server to the terminal during the network initialization. The start message is indicative of an initial message transmitted from the terminal to the server, such that the terminal requests the server to transmit its location information or location information of other terminals using the start message. The response message is indicative of a message answering to the start message. The positioning-initialization message is indicative of a message transmitted from the first terminal to the server during the initiation of the positioning service. The positioning message is indicative of a message communicated between the server and the first terminal to perform the positioning service. The end message is indicative of a message, which indicates the completion of a specific process or includes specific state information. The authentication response message is used when the network of the Non-Proxy Mode starts operation, and is transmitted from the home server to the terminal. The positioning notification message transmits location information of the first terminal to the second terminal, and includes the location information of the first terminal.

For example, in association with the present invention, a SUPL INIT message is used as the above-mentioned initialization message, a SUPL START message is used as the above-mentioned start message, a SUPL RESPONSE message is used as the above-mentioned response message, a SUPL POS INIT message is used as the above-mentioned positioning-initialization message, a SUPL POS message is used as the above-mentioned positioning message, a SUPL END message is used as the above-mentioned end message, and a SUPL AUTH RESP message is used as the above-mentioned authentication response message, and a SUPL POS NOTIFICATION message is used as the above-mentioned positioning notification message.

However, it is obvious to those skilled in the art that the present invention is not limited to the aforementioned examples, and can also be applied to other messages having the same technical scope as the present invention.

Prior to describing the following preferred embodiments of the present invention, it should be noted that a specific process in which a first SET requests its location information or transmits its location information to a second SET will be exemplarily described for the convenience of description and better understanding of the present invention.

FIG. 1A is a conceptual diagram illustrating a method for transmitting location information according to a first preferred embodiment of the present invention. Particularly, FIG. 1A shows the Non-Roaming Successful Case in which the first SET is located at the HN, and the Proxy Mode in which the first SET communicates with the SPC via the SLC.

Referring to FIG. 1A, the positioning system according to a first preferred embodiment of the present invention includes a first SET 100, a SLP 110, and a second SET 120.

The first SET 100 is indicative of a SET for initiating the positioning service, and can communicate with the SUPL network using the SUPL protocol. The first SET 100 performs a positioning process, in which the first SET 100 communicates with the SLP 110 acting as a server, to implement the positioning service, and acquires its location information.

The SLP 110 is a server acting as a network element capable of accessing/employing network resources, and is indicative of a SUPL SAP (Service Access Point) of a network. The SLP 110 may include the SPC serving as an entity for calculating location information of the first SET 100, and the SLC serving as an entity for managing overall SUPL protocols (e.g., SUPL session management, Roaming, and Resource Management, etc.).

The second SET 120 is a SET desired by the first SET 100 as a destination of the first SET 100's location information, and is a terminal indicating a logical SAP (Service Access Point) for employing the first SET 100's location information received from the SLP 110. In this case, the second SET 120 is a terminal which can communicate with the SUPL network using the SUPL protocol in the same manner as in the first SET 100.

For example, each of the first SET 100 and the second SET 120 is a User Terminal (UT) for use in a Universal Mobile Telecommunication System (UMTS), a Mobile Station (MS) for use in a GSM (Global System for Mobile Communication) or an IS-95, or a notebook computer and Personal Digital Assistant (PDA) for supporting the SUPL protocol.

A method for allowing the first SET 100 to acquire its location information using the SUPL protocol in the positioning system, or allowing the first SET 100 to transmit its location information to the second SET 120 according to the first preferred embodiment of the present invention will hereinafter be described.

The SLP 110 associated with a positioning procedure transmits the SUPL POS NOTIFICATION message to the second SET 120 to inform the second SET 120 of the first SET 100's location information.

In this case, the SUPL START message firstly transmitted from the first SET 100 to the SLP 110 may include notified SET-id information indicating a second SET ID, MO (Mobile Originated location request) mode information, and ACK (Acknowledgement) mode information.

The first SET 100 establishes a data link connection to a mobile communication network for data communication to start the SUPL session at step S100.

After executing the data link connection, the first SET 100 transmits the SUPL START message to the SLP 110, such that it can start the positioning procedure at step S101. In this case, the SUPL START message may include session-id information, lid information, qop information, SET capability information, notified SET-id information, MO mode information, and ACK mode information, etc.

The notified SET-id information is indicative of ID information of a second SET at which the first SET's location information is to be received. The MO mode information is indicative of mode information of a SET for initiating the first SET's location information request action. The MO mode information may include specific information indicating a first type (Type 1) or a second type (Type 2).

For example, if the MO mode information is the first type (Type 1), this means that the first SET 100 desires to receive its location information, and the SUPL START message may include session-id information, lid information, qop information, SET capability information, and MO mode information, etc. If the MO mode information is the second type (Type 2), this means that the first SET 100 desires to transmit its location information to the second SET 120, and the SUPL START message may include session-id information, lid information, qop information, SET capability information, notified SET-id information, MO mode information, and ACK mode information, etc.

The ACK mode information indicates whether there is a need for the second SET to transmit an acknowledgement signal indicating reception of the first SET's location information to the first SET.

In association with the above-mentioned description, the aforementioned Type-1 case in which the first SET requests the SLP to transmit location information of the first SET, and the aforementioned Type-2 case in which the first SET requests the SLP to transmit the first SET's location information to the second SET are classified according to the MO mode type information, and can also be applied to a variety of preferred embodiments shown in FIGS. 2A, 3A, 4A, 5A, and 7A~7C.

The preferred embodiment of the above-mentioned SUPL START message will hereinafter be described with reference to FIGS. 11A~11C. Also, the preferred embodiment of the above-mentioned SUPL START message can also be applied to other preferred embodiments of the present invention.

Upon receiving the SUPL START message from the first SET 100, the SLP 110 checks a roaming state of the first SET 100 at step S102.

After checking the roaming state of the first SET 100, the SLP 110 transmits the SUPL RESPONSE message including session-id information and posmethod information, etc. to the first SET 100, such that it informs the first SET 100 of the service request permission, and also informs the first SET 100 of the beginning of the positioning procedure at step S103. The SUPL RESPONSE message will hereinafter be described with reference to FIG. 12.

If the first SET 100 successfully receives the SUPL RESPONSE message from the SLP 110, it transmits the SUPL POS INIT message indicating the beginning of an actual positioning of the first SET 100 to the SLP 110 at step S104. The SUPL POS INIT message includes session-id information, lid information, and SET capability information, etc., and will be described with reference to FIG. 13.

If the SLP 110 receives the SUPL POS INIT message from the first SET 100, the SLP 110 and the first SET 100 calculate location information of the first SET 100 according to a variety of location calculation methods (e.g., a SET-Assisted A-GPS method, a SET-Based A-GPS method, and a Cell-id method, etc.) based on the SUPL START-, SUPL RESPONSE-, and SUPL POS INIT-messages, and a variety of positioning protocols (GSM: RRLP, 3GPP: RRC, and 3GPP2: TIA-801).

In this case, the positioning protocol message communicated between the SLP 110 and the first SET 100 is encapsulated into the SUPL POS message, such that transmission/ reception of the SUPL POS message including the positioning protocol message is executed at step S105. The SUPL POS message includes the session-id information and RRLP/RRC/TIA-801 information, and a detailed description thereof will be described with reference to FIG. 14.

If the location information of the first SET 100 is calculated at step S105, the SLP 110 transmits the SUPL END message to the first SET 100, such that it informs the first SET 100 of the end of the SUPL session for the positioning service at step S106. The SUPL END message includes session-id information and posresult information indicating the positioning result, and a detailed description thereof will be described with reference to FIG. 15.

In association with the above-mentioned description, if the MO mode information of the SUPL START message is indicative of the Type-1, the positioning procedure from the above step S100 to the above step S106 is executed. The following positioning procedure relates to the Type-2 case in which the SUPL START message includes the Type-2 MO mode information.

The SLP 110 transmits the first SET 100's location information calculated by the SUPL POS NOTIFICATION message including posresult information to the second SET 120 at step S107. In association with the above-mentioned description, if there is a management server (e.g., a location server) of the second SET 120, the SLP 110 may transmit the first SET 100's location information to the management server of the second SET 120. Upon receiving the first SET 100's location information, the management server of the second SET 120 may re-transmit the first SET 100's location information to the second SET 120.

In this case, the SUPL POS NOTIFICATION message may use the same transmission method as that of the SUPL INIT message. In association with the above-mentioned description, it should be noted that the SLP 110 may transmit the first SET 100's location information calculated by any one of a variety of messages (i.e., a MLP SLR (Mobile Location Protocol Standard Location Report) message, WAP PUSH, a SMS message, TCP/IP connection, and UDP/IP connection) to the second SET 120 as necessary.

A method for allowing the SLC 211 to transmit the first SET 200's location information to the second SET 220 can also be applied to other preferred embodiments of the present invention.

A detailed description of the above-mentioned SUPL INIT message will be described with reference to FIG. 10.

In the case where the first SET 100 requests the second SET 120 to transmit an acknowledgement signal indicating the reception of the first SET 100's location information using the ACK mode information of the SUPL START message, the second SET 120 may transmit the acknowledgement signal to the first SET 100 via the SLP 110.

For example, if there is a location server for managing the second SET 120, the second SET 120 may transmit the acknowledgement signal to the location server. The above-mentioned location response message is an RRLP SSRP message including an acknowledgement message, and may inform the SLP 110 of the transmission result of the first SET 100's location information.

The above-mentioned location information transmission process has been disclosed for only illustrative purposes, and the sequence of the location information transmission may be modified as necessary.

FIG. 1B is a conceptual diagram illustrating a method for transmitting location information according to a second preferred embodiment of the present invention.

Compared with the location information transmission method shown in FIG. 1A, only information contained in the SUPL START message at step S101 (during which the first SET 100 transmits the SUPL START message to the SLP 110) of FIG. 1B is different from that of FIG. 1A. Therefore, only the step S101 of FIG. 1B will be described for the convenience of description. It is obvious to those skilled in the art that a plurality of steps for the position information transmission method of FIG. 1A can also be applied to the preferred embodiment of FIG. 1B.

The first SET 100 transmits the SUPL START message to the SLP 110 to initiate the positioning procedure. In this case, the first SET 100 requests the SLP 110 to transmit location information of the second SET 120, or requests the SLP 110 to transmit the first SET 100's location information to the second SET 120 at step S101. For the above-mentioned request operations, the SUPL START message may include session-id information, lid information, qop information, SET capability information, SET ID information, and ACK mode information, etc. In this case, the SET ID information may be an ID of a target SET desired by a start SET initiating the positioning procedure such that the target SET can acquire the start SET's location information, or may be an ID of a third party desired by the start SET as a destination of the start SET's location information.

In association with the above-mentioned description, the ID of the target SET may be represented by a "Target SET ID", and the ID of the third party may be represented by a "Third Party ID".

For example, if the SET initiating the positioning procedure is the first SET 100 and the target SET desired by the first SET 100 is the second SET 120, the target SET ID may be the second SET 120's ID. If the SET initiating the positioning procedure is the first SET 100 and the third party is desired by the first SET 100 as a transmission destination of the first SET 100's location information, the third party ID may be the second SET 120's ID.

FIG. 2A is a conceptual diagram illustrating a method for transmitting location information according to a third preferred embodiment of the present invention. Particularly, FIG. 2A shows the Non-Roaming Successful Case in which the first SET is located at the HN, and the Proxy Mode in which the first SET directly communicates with the SPC.

Compared with the positioning system shown in FIG. 1A, the positioning system shown in FIG. 2A according to a third preferred embodiment of the present invention includes a first SET 200, a SLP 210, and a second SET 220. Differently from the positioning system of FIG. 1A, the positioning system of FIG. 2A includes a SLC 211 and a SPC 212 in the SLP 210. In this case, the SPC 212 is an entity for calculating location information of the first SET 200 acting as a positioning target terminal, and the SLC 211 is an entity for managing overall SUPL protocols (e.g., SUPL session management, Roaming, and Resource Management, etc.).

The first SET 200 establishes a data link connection to a mobile communication network for data communication to start the SUPL session at step S200.

After executing the data link connection, the first SET 200 transmits the SUPL START message to the SLC 211, such that it can start the positioning procedure. In this case, the first SET 200 may request the first SET 200's location information from the SLC 211, or may request the SLC 211 to transmit the first SET 200's location information to the second SET 220 at step S201. For the above-mentioned request operations, the SUPL START message may include session-id information, lid information, qop information, SET capability information, notified SET-id information indicating an ID of a second SET at which the first SET 200's location information is to be received, MO mode information, and ACK mode information, etc.

Upon receiving the SUPL START message from the first SET 200, the SLC 211 checks a roaming state of the first SET 200 at step S202.

After checking the roaming state of the first SET 200, the SLC 211 creates session-id information to be used for the session associated with the first SET 200, transmits the created session-id information, first SET-id information, a location calculation method, and positioning protocol information, etc. to the SPC 212, and indicates that a positioning session associated with the first SET 200 will begin at step S203.

The SLC 211 transmits the SUPL RESPONSE message to the first SET 200, such that it informs the first SET 200 of the service request permission, and informs the first SET 200 of the beginning of the positioning session at step S204. The SUPL RESPONSE message may include session-id information, SPC-address information, SET auth-key information, and key-id 4 information, etc. In this case, in order to command the first SET 200 to start the positioning session associated with the SPC 212, the SLC 211 may include the SPC address information in the SUPL RESPONSE message, and may transmit the resultant SUPL RESPONSE message including the SPC address information to the first SET 200.

Upon receiving the SUPL RESPONSE message including the SPC 212's address information from the SLC 211, the first SET 200 releases connection to the SLC 211, and transmits the SUPL POS INIT message to the SPC 212, such that it starts an actual positioning session of the first SET 200. In this case, if the SPC 212 receives the SUPL POS INIT message from the first SET 200, it informs the SLC 211 of the beginning of the positioning session associated with the first SET 200 at step S205.

The SPC 212 and the first SET 200 calculate location information of the first SET 200 according to a variety of location calculation methods (e.g., a SET-Assisted A-GPS method, a SET-Based A-GPS method, and a Cell-id method, etc.) and a variety of positioning protocols (GSM: RRLP, 3GPP: RRC, and 3GPP2: TIA-801). In this case, the positioning protocol message communicated between the SPC 212 and the first SET 200 is encapsulated into the SUPL POS message, such that transmission/reception of the SUPL POS message including the positioning protocol message is executed at step S206.

If the location information of the first SET 200 is calculated at step S206, the SPC 212 transmits the SUPL END message to the first SET 200, such that it informs the first SET 200 of the end of the SUPL session for the positioning service, and the first SET 200 releases connection to the SPC 212. The SPC 212 informs the SLC 211 of a SUPL session termination, and transmits the calculated location information to the SLC 211 at step S207.

The SLC 211 transmits the first SET 200's location information calculated by the SUPL POS NOTIFICATION message to the second SET 220. In this case, the SUPL POS NOTIFICATION message may use the same transmission method as that of the SUPL INIT message. In addition, a method for controlling the SLC 211 to transmit the calculated first SET's location information to the second SET 220 can also be applied to the transmission methods of FIG. 1A.

FIG. 2B is a conceptual diagram illustrating a method for transmitting location information according to a fourth preferred embodiment of the present invention.

Compared with the location information transmission method shown in FIG. 2A, only information contained in the SUPL START message at step S201 (during which the first SET 200 transmits the SUPL START message to the SLC 211) of FIG. 2B is different from that of FIG. 2A. Therefore, only the step S201 of FIG. 2B will be described for the convenience of description. It is obvious to those skilled in the art that a plurality of steps for the position information transmission method of FIG. 2A can also be applied to the preferred embodiment of FIG. 2B.

The first SET 200 transmits the SUPL START message to the SLC 211 to initiate the positioning procedure. In this case, the first SET 200 requests the SLP 210 to transmit location information of the second SET 220, or requests the SLP 210 to transmit the first SET 200's location information to the second SET 220 at step S201. For the above-mentioned request operations, the SUPL START message may include session-id information, lid information, qop information, SET capability information, SET ID information, and ACK mode information, etc.

For example, if the SET initiating the positioning procedure is the first SET 200 and the target SET desired by the first SET 200 is the second SET 220, the target SET ID may be the second SET 220's ID. If the SET initiating the positioning procedure is the first SET 200 and the third party is desired by the first SET 200 as a transmission destination of the first SET 200's location information, the third party ID may be the second SET 220's ID.

FIG. 3A is a conceptual diagram illustrating a method for transmitting location information according to a fifth preferred embodiment of the present invention. Particularly, FIG. 3A shows the Roaming Successful Case in which the first SET is located at the VN instead of the HN and the V-SLP performs the positioning procedure, and the Proxy Mode in which the first SET communicates with the SPC via the SLC and the V-SLP performs the positioning procedure.

The positioning system of FIG. 3A includes a first SET 300 acting as a positioning target terminal, a H-SLP 310 acting as a HN server, a V-SLP 320 acting as a VN server, a N-SLP 330 located at the second SET 340's network, and a second SET 340 for receiving the first SET 300's location information. In this case, the server located at the second SET 340's network is defined as the N-SLP 330. It is obvious to those skilled in the art that the server located at the second SET 340's network is defined as the N-SLP 330, and the N-SLP 330 acting as a logical entity may be equal to the H-SLP 310.

The first SET 300 establishes a data link connection to a mobile communication network for data communication to start the SUPL session at step S300.

After executing the data link connection, the first SET 300 transmits the SUPL START message to the H-SLP 310, such that it can start the positioning procedure. In this case, the first SET 300 may request the first SET 300's location information from the H-SLP 310, or may request the H-SLP 310 to transmit the first SET 300's location information to the second SET 340 at step S301. For the above-mentioned request operations, the SUPL START message may include session-id information, lid information, qop information, SET capability information, notified SET-id information indicating an ID of the second SET at which the first SET 300's location information is to be received, MO mode information, and ACK mode information, etc.

Upon receiving the SUPL START message from the first SET 300, the H-SLP 310 checks a roaming state of the first SET 300 at step S302.

Thereafter, the H-SLP 310 allows the SUPL START message (including session-id information, lid information, qop information, SET capability information, notified SET-id information, MO mode information, and ACK mode information, etc.) to be encapsulated into an RLP SSRLIR (Roaming Location Protocol Standard SUPL Roaming Location Immediate Request) message, and performs tunneling to the V-SLP 320 at step S303, such that the H-SLP 310 can calculate the first SET 300's location information via the V-SLP 320.

The V-SLP 320 permits the SUPL session request, and controls the SUPL RESPONSE message (including session-id information and V-SLP address information, etc.) to be encapsulated into an RLP SSRLIA (Roaming Location Protocol Standard SUPL Roaming Location Immediate Answer) message, and performs tunneling to the H-SLP 320 at step S304.

The H-SLP 310 performs de-capsulation of the RLP SSR-LIA message received from the V-SLP 320, and transmits the SUPL RESPONSE message (including the session-id information, etc.) to the first SET 300. In this case, the H-SLP 310 may not include the V-SLP address in the SUPL RESPONSE message, such that the first SET 300 can communicate with the V-SLP 320 via the H-SLP 310.

If the first SET 300 successfully receives the SUPL RESPONSE message from the H-SLP 310, it informs the H-SLP 310 of the beginning of an actual positioning operation, and transmits the SUPL POS INIT message (including session-id information, lid information, and SET capability information, etc.) to the H-SLP 310 at step S306.

Upon receiving the SUPL POS INIT message from the first SET 300, the H-SLP performs tunneling of the SUPL POS INIT message to the V-SLP 320 at step S307.

Upon receiving the RLP SSRP message including the SUPL POS INIT message, the V-SLP 320 and the first SET 300 calculate a location of the first SET 300 according to a variety of location calculation methods (e.g., a SET-Assisted A-GPS method, a SET-Based A-GPS method, and a Cell-id method, etc.) and a variety of positioning protocols (GSM: RRLP, 3GPP: RRC, and 3GPP2: TIA-801), and acquire location information of the first SET 300 at step S308. In this case, the message communicated between the V-SLP 320 and the first SET 300 is transmitted/received via the H-SLP 310.

If the first SET 300's location information is calculated and acquired at step S308, the V-SLP 320 transmits the SUPL END message (including session-id information and posresult information) to the H-SLP 310 via the RLP SSRP message at step S309.

The H-SLP 310 performs de-capsulation of the RLP SSRP message to acquire the SUPL END message, and transmits the SUPL END message to the first SET 300, such that it informs the first SET 300 of the end of the SUPL session for the positioning service at step S310. The first SET 300 releases connection to the H-SLP 310 at step S310.

A first case in which the H-SLP 310 is equal to the N-SLP 330 and a second case in which the H-SLP 310 is different from the N-SLP 330 include different processing from S310, and detailed descriptions of the first and second cases will hereinafter be described.

If the H-SLP 310 is different from the N-SLP 330, the H-SLP 310 encapsulates the SUPL POS NOTIFICATION message equipped with the calculated location information (posresult) into the RLP SSRP message, and performs tunneling to the N-SLP 330 at step S311.

The N-SLP 330 performs de-capsulation of the received RLP SSRP message, and transmits the SUPL POS NOTIFICATION message including the calculated location information (posresult) to the second SET 340 at step S312. In this case, the SUPL POS NOTIFICATION message may use the same transmission method as that of the SUPL INIT message, and it is obvious to those skilled in the art that other examples including the calculated location information (posresult) may also be used as the SUPL POS NOTIFICATION message.

However, if the H-SLP 310 is equal to the N-SLP 330, the H-SLP 310 may transmit the SUPL POS NOTIFICATION message including the calculated location information (posresult) to the second SET 340.

FIG. 3B is a conceptual diagram illustrating a method for transmitting location information according to a sixth preferred embodiment of the present invention.

Compared with the location information transmission method shown in FIG. 3A, only information contained in the SUPL START message at step S301 (during which the first SET 300 transmits the SUPL START message to the H-SLP 310) of FIG. 3B is different from that of FIG. 3A. Therefore, only the step S301 of FIG. 3B will be described for the convenience of description. It is obvious to those skilled in the art that a plurality of steps for the position information transmission method of FIG. 3A can also be applied to the preferred embodiment of FIG. 3B.

The first SET 300 transmits the SUPL START message to the H-SLP 310 to initiate the positioning procedure. In this case, the first SET 300 requests the H-SLP 310 to transmit location information of the second SET 340, or requests the H-SLP 310 to transmit the first SET 300's location information to the second SET 340 at step S301. For the above-mentioned request operations, the SUPL START message may include session-id information, lid information, qop information, SET capability information, SET ID information, and ACK mode information, etc.

For example, if the SET initiating the positioning procedure is the first SET 300 and the target SET desired by the first SET 300 is the second SET 340, the target SET ID may be the second SET 340's ID. If the SET initiating the positioning procedure is the first SET 300 and the third party is desired by the first SET 300 as a transmission destination of the first SET 300's location information, the third party ID may be the second SET 340's ID.

FIG. 4A is a conceptual diagram illustrating a method for transmitting location information according to a seventh preferred embodiment of the present invention. Particularly, FIG. 4A shows the Roaming Successful Case in which the first SET is located at the VN instead of the HN and the V-SPC performs the positioning procedure, and the Non-Proxy Mode in which the first SET directly communicates with the SPC and the V-SPC performs the positioning procedure.

The positioning system of FIG. 4A includes a first SET 400 acting as a positioning target terminal, a V-SLP 410 acting as a VN server, a H-SLP 420 acting as a HN server, a N-SLP 430 located at the second SET 440's network, and a second SET 440 for receiving the first SET 400's location information. In this case, the V-SLP 410 may include the V-SPC 412 for calculating location information of the first SET 400 acting as the positioning target terminal; and a V-SLC 411 for managing overall SUPL protocols (e.g., SUPL session management, Roaming, and Resource Management, etc.).

In association with the above-mentioned description, the server located at the second SET 440's network is defined as the N-SLP 430, but the N-SLP 430 acting as a logical entity may be equal to or different from the H-SLP 420.

The first SET 400 establishes a data link connection to a mobile communication network for data communication to start the SUPL session at step S400.

After executing the data link connection, the first SET 400 transmits the SUPL START message to the H-SLP 420, such that it can start the positioning procedure. In this case, the first SET 400 may request the first SET 400's location information from the H-SLP 420, or may request the H-SLP 420 to transmit the first SET 400's location information to the second SET 440 at step S401. For the above-mentioned request operations, the SUPL START message may include session-id information, lid information, qop information, SET capability information, notified SET-id information indicating an ID of the second SET at which the first SET 400's location information is to be received, MO mode information, and ACK mode information, etc.

Upon receiving the SUPL START message from the first SET 400, the H-SLP 420 checks a roaming state of the first SET 400 at step S402.

Thereafter, the H-SLP 420 allows the SUPL START message (including session-id information, lid information, qop information, and SET capability information, etc.) to be encapsulated into an RLP SSRLIR message, and performs tunneling to the V-SLC 411 at step S403, such that the H-SLP 420 can calculate the first SET 400's location information via the V-SLC 411.

The V-SLC 411 permits the SUPL session request, and assigns the session-id to be used for the session associated with the first SET 400. Also, the V-SLC 411 transmits the assigned session-id information, the first SET's information, location calculation method information, and positioning protocol information to the V-SPC 412, and informs the V-SPC 412 of the beginning of the positioning session associated with the first SET 400 at step S404.

The V-SLC 411 encapsulates the SUPL RESPONSE message (including the session-id information, and the V-SLP address, etc.) into the RLP SSRLIA message, and performs tunneling to the H-SLP 420. In this case, the V-SLC 411 includes the V-SPC address in the SUPL RESPONSE message, such that the first SET 400 can establish the positioning session associated with the V-SPC 412 at step S405.

The H-SLP 420 generates an authentication-associated key to be used for the session between the V-SPC 412 and the first SET 400, encapsulates the SUPL AUTH RESP message (including session-id information, SPC auth-key information, and key-id 3 information, etc.) into the RLP SSRP message, and transmits the encapsulation-associated information to the V-SLC 411 at step S406.

The H-SLP 420 performs de-capsulation of the RLP SSRLIA message, which has been received from the V-SLC 411 at step S405, and transmits the SUPL RESPONSE message (including the session-id information, V-SPC address information, SET auth-key information, and key-id 4 information, etc.) to the first SET 400 at step S407. The SUPL RESPONSE message may include V-SPC address and authentication-associated key information at step S407.

If the first SET 400 successfully receives the SUPL RESPONSE message from the H-SLP 420, it releases connection to the H-SLP 420, and establishes a positioning session connected to the V-SPC 412 using the received information. The first SET 400 transmits the SUPL POS INIT message (including session-id information, lid information, and SET capability information, etc.) indicating the beginning of the positioning process to the V-SPC 412. Upon receiving the SUPL POS INIT message from the first SET 400, the V-SPC 412 informs the first SET 400 of the beginning of the positioning session associated with the first SET 400 at step S408.

If the SUPL POS INIT message is received in the V-SPC 412 and the first SET 400, the V-SPC 412 and the first SET 400 calculate a location of the first SET 400 according to a variety of location calculation methods (e.g., a SET-Assisted A-GPS method, a SET-Based A-GPS method, and a Cell-id method, etc.) and a variety of positioning protocols (GSM: RRLP, 3GPP: RRC, and 3GPP2: TIA-801), and acquire location information of the first SET 400 at step S409. In this case, the positioning protocol message communicated between the V-SPC 412 and the first SET 400 is encapsulated into the SUPL POS message, such that transmission/reception of the SUPL POS message including the positioning protocol message is executed.

If the first SET 400's location information is calculated and acquired at step S409, the V-SPC 412 transmits the SUPL END message (including session-id information and posresult information) to the first SET 400, and the first SET 400 releases connection to the V-SPC 412 at step S410.

The V-SPC 412 transmits the calculated first SET 400's location information to the V-SLC 411, and informs the V-SLC 411 of the end of the SUPL session at step S411.

Upon receiving the calculated first SET 400's location information from the V-SPC 412, the V-SLC 411 performs tunneling of the SUPL END message (including the session-id information and the calculated location information (posresult)) to the H-SCLP 420 using the RLP SSRP message at step S412.

A first case in which the H-SLP 420 is equal to the N-SLP 430 and a second case in which the H-SLP 420 is different from the N-SLP 430 include different processing from S412, and detailed descriptions of the first and second cases will hereinafter be described.

If the H-SLP 420 is different from the N-SLP 430, the H-SLP 420 encapsulates the SUPL POS NOTIFICATION message equipped with the calculated location information (posresult) into the RLP SSRP message, and performs tunneling to the N-SLP 430 at step S413.

The N-SLP 430 performs de-capsulation of the received RLP SSRP message, and transmits the SUPL POS NOTIFICATION message including the calculated location information (posresult) to the second SET 440 at step S414. In this case, the SUPL POS NOTIFICATION message may use the same transmission method as that of the SUPL INIT message, and it is obvious to those skilled in the art that other examples including the calculated location information (posresult) may also be used as the SUPL POS NOTIFICATION message.

However, if the H-SLP 420 is equal to the N-SLP 430, the H-SLP 420 may transmit the SUPL POS NOTIFICATION message including the calculated location information (posresult) to the second SET 440.

FIG. 4B is a conceptual diagram illustrating a method for transmitting location information according to an eighth preferred embodiment of the present invention.

Compared with the location information transmission method shown in FIG. 4A, only information contained in the SUPL START message at step S401 (during which the first SET 400 transmits the SUPL START message to the H-SLP 420) of FIG. 4B is different from that of FIG. 4A. Therefore, only the step S401 of FIG. 4B will be described for the convenience of description. It is obvious to those skilled in the art that a plurality of steps for the position information transmission method of FIG. 4A can also be applied to the preferred embodiment of FIG. 4B.

The first SET 400 transmits the SUPL START message to the H-SLP 420 to initiate the positioning procedure. In this case, the first SET 400 requests the H-SLP 420 to transmit location information of the second SET 440, or requests the H-SLP 420 to transmit the first SET 400's location information to the second SET 440 at step S401. For the above-mentioned request operations, the SUPL START message may include session-id information, lid information, qop information, SET capability information, SET ID information, and ACK mode information, etc.

For example, if the SET initiating the positioning procedure is the first SET 400 and the target SET desired by the first SET 400 is the second SET 440, the target SET ID may be the second SET 440's ID. If the SET initiating the positioning procedure is the first SET 400 and the third party is desired by the first SET 400 as a transmission destination of the first SET 400's location information, the third party ID may be the second SET 440's ID.

Figure 5A:
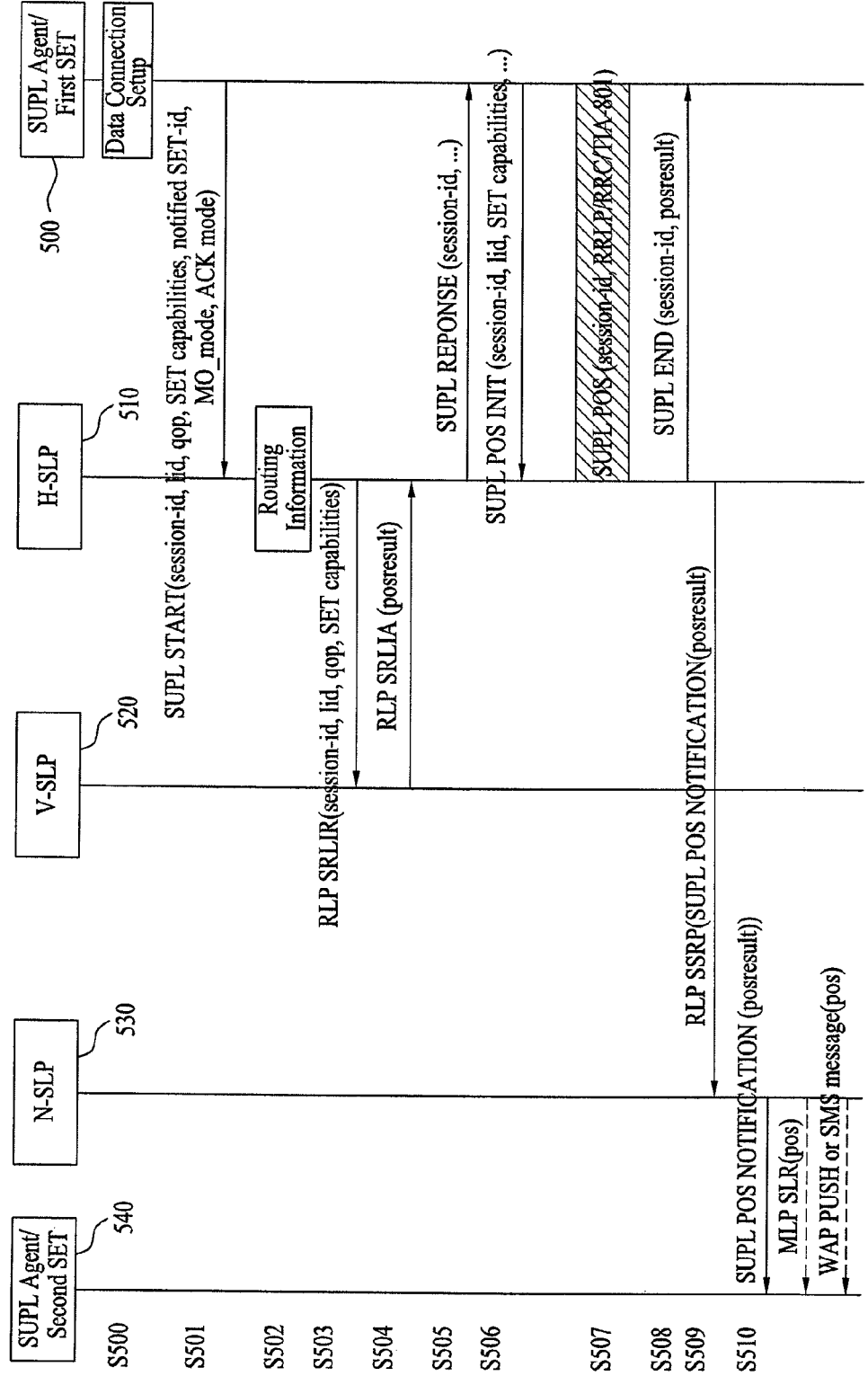
FIG. 5A is a conceptual diagram illustrating a method for transmitting location information according to a ninth preferred embodiment of the present invention.

FIG. 5A is a conceptual diagram illustrating a method for transmitting location information according to a ninth preferred embodiment of the present invention. Particularly, FIG. 5A shows the Roaming Successful Case in which the first SET is located at the VN instead of the HN and the V-SPC performs the positioning procedure, and the Non-Proxy Mode in which the first SET directly communicates with the SPC and the V-SPC performs the positioning procedure.

The positioning system of FIG. 5A includes a first SET 500 acting as a positioning target terminal, a H-SLP 510 acting as a HN server, a V-SLP 520 acting as a VN server, a N-SLP 530 located at the second SET 540's network, and a second SET 540 for receiving the first SET 500's location information.

In association with the above-mentioned description, the server located at the second SET 540's network is defined as the N-SLP 530, but the N-SLP 530 acting as a logical entity may be equal to or different from the H-SLP 510.

The first SET 500 establishes a data link connection to a mobile communication network for data communication to start the SUPL session at step S500.

After executing the data link connection, the first SET 500 transmits the SUPL START message to the H-SLP 510, such that it can start the positioning procedure. In this case, the first SET 500 may request the first SET 500's location information from the H-SLP 510, or may request the H-SLP 510 to transmit the first SET 500's location information to the second SET 540. For the above-mentioned request operations, the SUPL START message may include session-id information, lid information, qop information, SET capability information, notified SET-id information indicating an ID of the second SET at which the first SET 500's location information is to be received, MO mode information, and ACK mode information, etc. at step S501.

Upon receiving the SUPL START message from the first SET 500, the H-SLP 510 checks a roaming state of the first SET 500 at step S502.

Thereafter, the H-SLP 510 executes the positioning session, and transmits an RLP SRLIR (Roaming Location Protocol Standard Roaming Location Immediate Request) message (including session-id information, lid information, qop information, and SET capability information, etc.) to the V-SLP 520 at step S503, such that it can request uncalculated first SET 500's location information from the V-SLP 520.

The V-SLP 520 transmits the uncalculated location information to the H-SLP 510 via the RLP SRLIA (Roaming Location Protocol Standard Roaming Location Immediate Answer) message at step S504.

The H-SLP 510 transmits the SUPL RESPONSE message (including the session-id information, etc.) to the first SET 500, such that it informs the first SET 500 of the service request permission, and also informs the first SET 500 of the beginning of the positioning procedure at step S505.

If the first SET 500 successfully receives the SUPL RESPONSE message from the H-SLP 510, it transmits the SUPL POS INIT message (including session-id information, lid information, and SET capability information, etc.) indicating the beginning of an actual positioning of the first SET 500 to the H-SLP 510 at step S506.

If the H-SLP 510 receives the SUPL POS INIT message from the first SET 500, the H-SLP 510 and the first SET 500 calculate location information of the first SET 500 according to a variety of location calculation methods (e.g., a SET-Assisted A-GPS method, a SET-Based A-GPS method, and a Cell-id method, etc.) based on the SUPL START-, SUPL RESPONSE-, and SUPL POS INIT-messages, and a variety of positioning protocols (GSM: RRLP, 3GPP: RRC, and 3GPP2: TIA-801) at step S507.

In this case, the positioning protocol message communicated between the H-SLP 510 and the first SET 500 is encapsulated into the SUPL POS message, such that transmission/reception of the SUPL POS message including the positioning protocol message is executed at step S507.

If the location information of the first SET 500 is calculated and acquired at step S507, the H-SLP 510 transmits the SUPL END message (including session-id information and posresult information) to the first SET 500, such that it informs the first SET 500 of the end of the SUPL session for the positioning service at step S508, such that the first SET 500 releases connection to the H-SLP 510 at step S508.

A first case in which the H-SLP 510 is equal to the N-SLP 530 and a second case in which the H-SLP 510 is different from the N-SLP 530 include different processing from S508, and detailed descriptions of the first and second cases will hereinafter be described.

If the H-SLP 510 is different from the N-SLP 530, the H-SLP 510 encapsulates the SUPL POS NOTIFICATION message equipped with the calculated location information (posresult) into the RLP SSRP message, and performs tunneling to the N-SLP 530 at step S509.

The N-SLP 530 performs de-capsulation of the received RLP SSRP message, and transmits the SUPL POS NOTIFICATION message including the calculated location information (posresult) to the second SET 540 at step S510.

In this case, the SUPL POS NOTIFICATION message may use the same transmission method as that of the SUPL INIT message, and it is obvious to those skilled in the art that other examples including the calculated location information (posresult) may also be used as the SUPL POS NOTIFICATION message.

However, if the H-SLP 510 is equal to the N-SLP 530, the H-SLP 510 may transmit the SUPL POS NOTIFICATION message including the calculated location information (posresult) to the second SET 540.

Figure 5B:
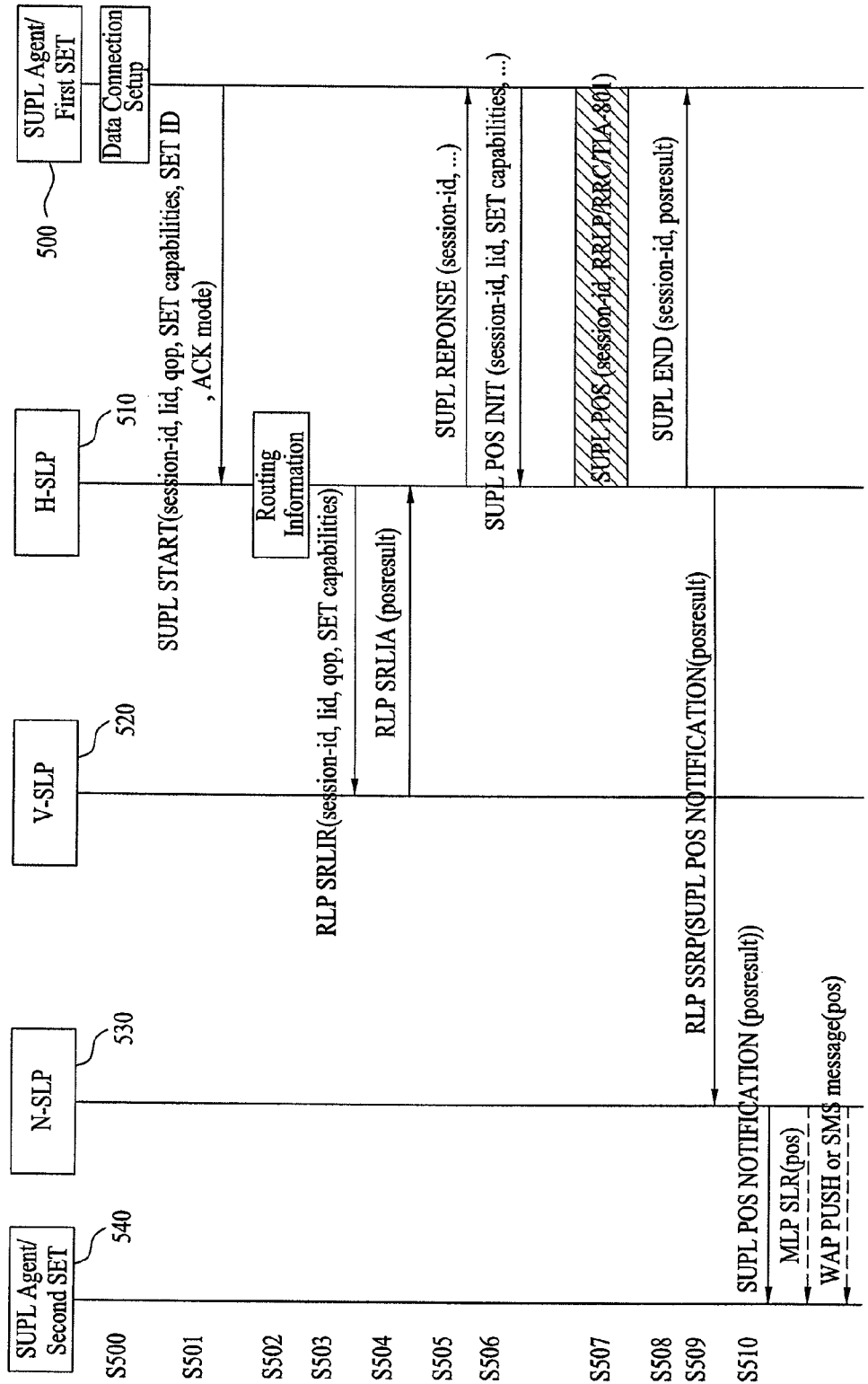
FIG. 5B is a conceptual diagram illustrating a method for transmitting location information according to a 10-th preferred embodiment of the present invention.

FIG. 5B is a conceptual diagram illustrating a method for transmitting location information according to a 10-th preferred embodiment of the present invention.

Compared with the location information transmission method shown in FIG. 5A, only information contained in the SUPL START message at step S501 (during which the first SET 500 transmits the SUPL START message to the H-SLP 510) of FIG. 5B is different from that of FIG. 5A. Therefore, only the step S501 of FIG. 5B will be described for the convenience of description. It is obvious to those skilled in the art that a plurality of steps for the position information transmission method of FIG. 5A can also be applied to the preferred embodiment of FIG. 5B.

The first SET 500 transmits the SUPL START message to the H-SLP 510 to initiate the positioning procedure. In this case, the first SET 500 requests the H-SLP 510 to transmit location information of the second SET 540, or requests the H-SLP 510 to transmit the first SET 500's location information to the second SET 540 at step S501. For the above-mentioned request operations, the SUPL START message may include session-id information, lid information, qop information, SET capability information, SET ID information, and ACK mode information, etc.

For example, if the SET initiating the positioning procedure is the first SET 500 and the target SET desired by the first SET 500 is the second SET 540, the target SET ID may be the second SET 540's ID. If the SET initiating the positioning procedure is the first SET 500 and the third party is desired by the first SET 500 as a transmission destination of the first SET 500's location information, the third party ID may be the second SET 540's ID.

Figure 6A:
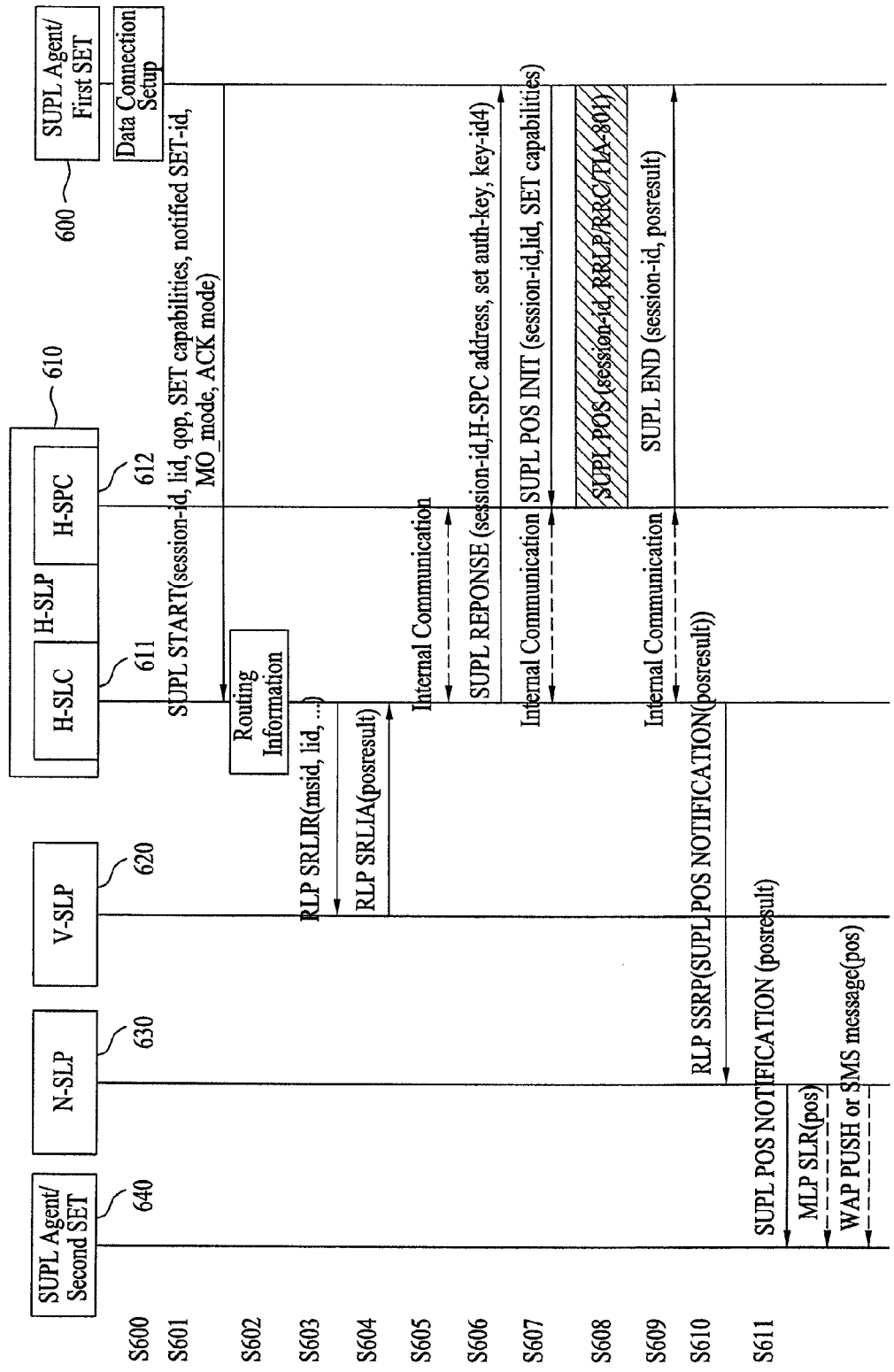
FIG. 6A is a conceptual diagram illustrating a method for transmitting location information according to an 11-th preferred embodiment of the present invention.

FIG. 6A is a conceptual diagram illustrating a method for transmitting location information according to an 11-th preferred embodiment of the present invention. Particularly, FIG. 6A shows the Roaming Successful Case in which the first SET is located at the VN instead of the HN and the H-SPC performs the positioning procedure, and the Non-Proxy Mode in which the first SET directly communicates with the SPC and the H-SPC performs the positioning procedure.

The positioning system of FIG. 6A includes a first SET 600 acting as a positioning target terminal, a H-SLP 610 acting as a HN server, a V-SLP 620 acting as a VN server, a N-SLP 630 located at the second SET 640's network, and a second SET 640 for receiving the first SET 600's location information. In this case, the H-SLP 610 may include a H-SPC 612 for calculating location information of the first SET 600 acting as the positioning target terminal; and a H-SLC 611 for managing overall SUPL protocols (e.g., SUPL session management, Roaming, and Resource Management, etc.).

In association with the above-mentioned description, the server located at the second SET 640's network is defined as the N-SLP 630, but the N-SLP 630 acting as a logical entity may be equal to or different from the H-SLP 610.

The first SET 600 establishes a data link connection to a mobile communication network for data communication to start the SUPL session at step S600.

After executing the data link setup, the first SET 600 transmits the SUPL START message to the H-SLC 611, such that it can start the positioning procedure.

In this case, the first SET 600 may request the first SET 600's location information from the H-SLC 611, or may request the H-SLC 611 to transmit the first SET 600's location information to the second SET 640 at step S601. For the above-mentioned request operations, the SUPL START message may include session-id information, lid information, qop information, SET capability information, notified SET-id information indicating an ID of the second SET at which the first SET 600's location information is to be received, MO mode information, and ACK mode information, etc.

Upon receiving the SUPL START message from the first SET 600, the H-SLC 611 checks a roaming state of the first SET 600 at step S602.

Thereafter, the H-SLC 611 transmits an RLP SRLIR message (including msid information and lid information, etc.) to the V-SLP 620 at step S603, such that the H-SPC 612 can execute the positioning session and can request uncalculated location information from the V-SLP 620.

Upon receiving the RLP SRLIR message, the V-SLP 620 transmits the uncalculated location information to the H-SLC 611 via the RLP SRLIA message at step S604.

The H-SLC 611 creates session-id information to be used for the session associated with the first SET 600, transmits the created session-id information, the uncalculated first SET-id information, location calculation method information, and positioning protocol information, etc. to the H-SPC 612, and indicates that a positioning session associated with the first SET 600 will begin at step S605.

The H-SLC 611 transmits the SUPL RESPONSE message (including session-id information, H-SPC address information, set auth-key information, and key-id 4, etc.) to the first SET 600, such that it informs the first SET 600 of the service request permission, and also informs the first SET 600 of the beginning of the positioning session. In other words, in order to command the first SET 600 to initiate the positioning session along with the H-SPC 612, the H-SLC 611 includes the H-SPC address information in the SUPL RESPONSE message, and transmits the SUPL RESPONSE message including the H-SPC address information at step S606.

Upon receiving the SUPL RESPONSE message including the H-SPC address information from the H-SLC 611, the first SET 600 releases connection to the H-SLC 611, and transmits the SUPL POS INIT message (including session-id information, lid information, and SET capability information, etc.) to the H-SPC 612, such that it informs the H-SPC 612 of the beginning of an actual positioning session. In this case, the H-SPC 612 informs the H-SLC 611 of the beginning of the positioning session associated with the first SET 600 at step S607.

Upon receiving the SUPL POS INIT message, the H-SPC 612 and the first SET 600 calculate a location of the first SET 600 according to a variety of location calculation methods (e.g., a SET-Assisted A-GPS method, a SET-Based A-GPS method, and a Cell-ID method, etc.) and a variety of positioning protocols (GSM: RRLP, 3GPP: RRC, and 3GPP2: TIA-801), and acquire location information of the first SET 600 at step S608. In this case, the positioning protocol message communicated between the H-SPC 612 and the first SET 600 is encapsulated into the SUPL POS message, such that the SUPL POS message including the positioning protocol message is transmitted/received.

If the first SET 600's location information is calculated and acquired at step S608, the H-SPC 612 transmits the SUPL END message (including session-id information and posresult information) to the first SET 600, such that it informs the first SET 600 of the end of the SUPL session for the positioning service at step S609.

A first case in which the H-SLP 610 is equal to the N-SLP 630 and a second case in which the H-SLP 610 is different from the N-SLP 630 include different processing from S609, and detailed descriptions of the first and second cases will hereinafter be described.

If the H-SLP 610 is different from the N-SLP 630, the H-SLP 610 encapsulates the SUPL POS NOTIFICATION message equipped with the calculated location information (posresult) into the RLP SSRP message, and performs tunneling to the N-SLP 630 at step S610.

The N-SLP 630 performs de-capsulation of the received RLP SSRP message, and transmits the SUPL POS NOTIFICATION message including the calculated location information (posresult) to the second SET 640 at step S611. In this case, the SUPL POS NOTIFICATION message may use the same transmission method as that of the SUPL INIT message, and it is obvious to those skilled in the art that other examples including the calculated location information (posresult) may also be used as the SUPL POS NOTIFICATION message.

However, if the H-SLP 610 is equal to the N-SLP 630, the H-SLP 610 may transmit the SUPL POS NOTIFICATION message including the calculated location information (posresult) to the second SET 640.

FIG. 6B is a conceptual diagram illustrating a method for transmitting location information according to a 12-th preferred embodiment of the present invention.

Compared with the location information transmission method shown in FIG. 6A, only information contained in the SUPL START message at step S601 (during which the first SET 600 transmits the SUPL START message to the H-SLC 611) of FIG. 6B is different from that of FIG. 6A. Therefore, only the step S601 of FIG. 6B will be described for the convenience of description. It is obvious to those skilled in the art that a plurality of steps for the position information transmission method of FIG. 6A can also be applied to the preferred embodiment of FIG. 6B.

The first SET 600 transmits the SUPL START message to the H-SLC 611 to initiate the positioning procedure. In this case, the first SET 600 requests the H-SLP 610 to transmit location information of the second SET 640, or requests the H-SLP 610 to transmit the first SET 600's location information to the second SET 640 at step S601. For the above-mentioned request operations, the SUPL START message may include session-id information, lid information, qop information, SET capability information, SET ID information, and ACK mode information, etc.

For example, if the SET initiating the positioning procedure is the first SET 600 and the target SET desired by the first SET 600 is the second SET 640, the target SET ID may be the second SET 640's ID. If the SET initiating the positioning procedure is the first SET 600 and the third party is desired by the first SET 600 as a transmission destination of the first SET 600's location information, the third party ID may be the second SET 640's ID.

Figure 7B:
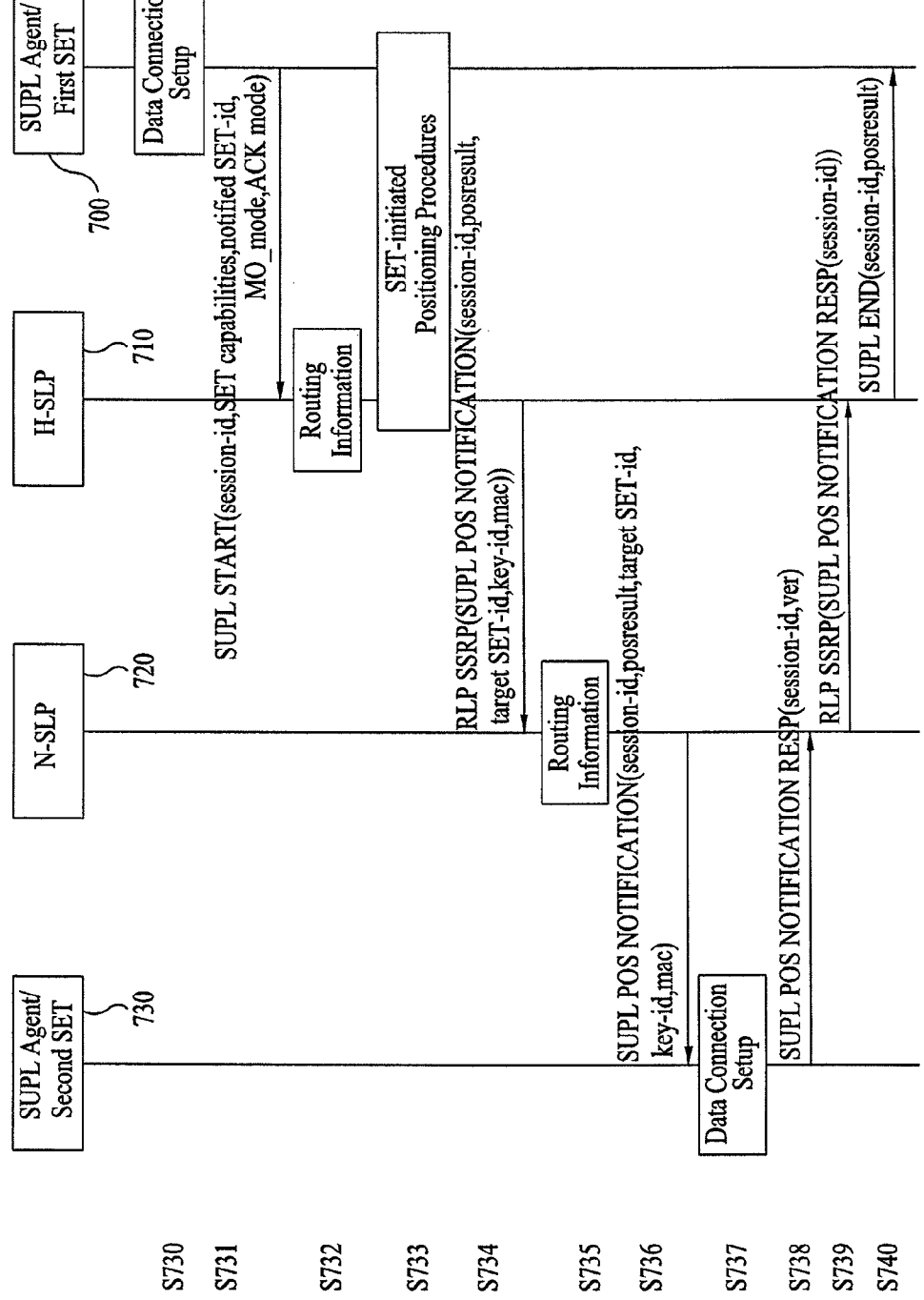

FIGS. 7A~7C are conceptual diagrams illustrating a method for transmitting location information according to a 13-th preferred embodiment of the present invention. Particularly, FIGS. 7A~7C exemplarily show a specific case in which the SUPL protocol is used between SLPs.

The positioning system of FIGS. 7A~7C includes a first SET 700 acting as a positioning target terminal, a H-SLP 710 acting as a HN server, a N-SLP 720 located at the second SET 730's network, and a second SET 730 for receiving the first SET 700's location information.

In association with the above-mentioned description, the server located at the second SET 730's network is defined as the N-SLP 720, but the N-SLP 720 acting as a logical entity may be equal to or different from the H-SLP 710.

A method for transmitting the first SET 700's location information to the second SET 730 using the SUPL protocol between SLPs will hereinafter be described with reference to FIG. 7A.

The first SET 700 establishes a data link connection to a mobile communication network for data communication to start the SUPL session at step S710.

After executing the data link setup, the first SET 700 transmits the SUPL START message to the H-SLP 710, such that it can start the positioning procedure. In this case, the first SET 700 may request the first SET 700's location information from the H-SLP 710, or may request the H-SLP 711 to transmit the first SET 700's location information to the second SET 730 at step S711. For the above-mentioned request operations, the SUPL START message may include session-id information, lid information, qop information, SET capability information, notified SET-id information indicating an ID of the second SET at which the first SET 700's location information is to be received, MO mode information, and ACK mode information, etc.

In this case, if the MO mode information is the first type (Type 1), the first SET 700 may include specific information, indicating that the first SET 700 desires to transmit its location information to the second SET 730, in the SUPL START message. The ACK mode information may include specific information indicating whether there is a need for the second SET 730 to transmit an acknowledgement signal indicating reception of the first SET 700's location information to the first SET 700.

Provided that the ACK mode indicates that the second SET 730 must transmit the acknowledgement signal indicating the reception of the first SET 700's location information to the first SET 700, the second SET 730 receiving the first SET 700's location information may transmit the above-mentioned acknowledgement signal to the first SET 700.

The above-mentioned acknowledgement action of the second SET 730 can be executed by the following steps S718~720.

Upon receiving the SUPL START message from the first SET 700, the H-SLP 710 checks a roaming state of the first SET 700 and indicates whether the first SET 700 supports the SUPL protocol. The H-SLP 710 inspects a first SET 700's privacy setup associated with the first SET 700, and informs the first SET 700 that the first SET 700's location information has been transmitted to the second SET 730 by referring to the first SET 700's privacy setup.

In order to protect an authorized user of the first SET 700 from malicious or fraudulent application, the H-SLP 710 can transmit a notification signal, associated with transmission of location information flowing in the second SET 730, to the first SET 700, irrespective of the first SET 700's privacy setup, at step S712.

The H-SLP 710 and the first SET 700 execute the SET-initiated positioning procedure prescribed in the SUPL protocol at step S713.

If the first SET 700's location information is calculated and acquired at step S713, the H-SLP 710 transmits the SUPL NOTIFICATION REQ message to the N-SLP 720 acting as a HN of the second SET, such that it requests the N-SLP 720 to transmit the first SET 700's location information to the second SET 730.

In this case, the SUPL NOTIFICATION REQ message may include session-id information, posresult information indicating the first SET 700's location information, target SET-id information indicating the first SET's ID, and notified SET-id information indicating the first SET's ID at step 714.

The N-SLP 720 receives the SUPL NOTIFICATION REQ message, checks a roaming sate of the second SET 730, and determines whether the second SET 730 supports the SUPL protocol at step 715.

The N-SLP 720 transmits the SUPL POS NOTIFICATION message to the second SET 730, such that it starts a notification session associated with the second SET 730. In this case, the SUPL POS NOTIFICATION message may include session-id information, posresult information indicating the first SET 700's location information, target SET-id information indicating the first SET's ID, key-id information for authenticating the SUPL POS NOTIFICATION message, and mac information, etc. at step S716.

In association with the above-mentioned description, as previously stated above, the above-mentioned SUPL POS NOTIFICATION message can be transmitted to a destination according to one of a variety of methods (e.g., WAP PUSH, and SMS Trigger, etc.), such that a detailed description thereof will herein be omitted for the convenience of description.

The second SET 730 receives the SUPL POS NOTIFICATION message, and establishes a data link connection to the mobile communication network for data communication. In this case, provided that the received SUPL POS NOTIFICATION message includes key-id information and mac information, and the second SET 730 supports an authentication mechanism using the SUPL POS NOTIFICATION message, the second SET 730 authenticates the received SUPL POS NOTIFICATION message using the key-id information and mac information at step S717.

The second SET 730 transmits the SUPL END message to the N-SLP 720, and informs the N-SLP 720 of the processing result of the SUPL POS NOTIFICATION message and the end of the notification session. In this case, if the ACK mode information of the SUPL START message indicates that there is a need for the second SET 730 to transmit an acknowledgement signal, indicating the reception of the first SET 700's location information, to the first SET 700, the second SET 730 receiving the first SET 700's location information includes the acknowledgement signal in the SUPL END message, and transmits the SUPL END message including the acknowledgement signal to the N-SLP 720 at step S718.

The N-SLP 720 transmits the SUPL NOTIFICATION RESP message to the H-SLP 710, such that it informs the H-SLP 710 of the processing result of the notification request and the end of the session. In this case, if the N-SLP 720 receives the acknowledgement signal from the second SET 730, it includes the acknowledgement signal into the SUPL NOTIFICATION RESP message, and transmits the SUPL NOTIFICATION RESP message including the acknowledgement signal to the H-SLP 710 at step S719.

The H-SLP 710 transmits the SUPL END message to the first SET 700, and informs the first SET 700 of both its location information transmission result and the end of the SUPL session. In this case, if the H-SLP 710 receives the acknowledgement signal from the N-SLP 720, it includes the acknowledgement signal into the SUPL END message, and transmits the SUPL END message including the acknowledgement signal to the first SET 700 at step S720.

A method for transmitting the first SET 700's location information to the second SET 730 using the SUPL Roaming service of an RLP (Roaming Location Protocol) between SLPs will hereinafter be described with reference to FIG. 7B.

Compared with the procedures of FIG. 7A, steps S734, S738, and S739 of FIG. 7B are different from steps S714, S718, and S719 of FIG. 7A, and the remaining steps of FIG. 7B are equal to those of FIG. 7A, such that only the above-mentioned steps S734, S738, and S739 of FIG. 7B will be described. For the convenience of description, it should be noted that step S734 is called a first step, step S738 is called a second step, and step S739 is called a third step.

In the case of the first step S734, the first SET 700's location information is calculated by the SET-initiated positioning procedure. If the first SET 700's location information is acquired, the H-SLP 710 transmits the SUPL POS NOTIFICATION message to the N-SLP 720 acting as the second SET's HN via the RLP SSRP message, and requests the N-SLP 720 to transmit the first SET 700's location information to the second SET 730.

In this case, the SUPL POS NOTIFICATION message may include session-id information, posresult indicating the first SET 700's location information, target SET-id information indicating the first SET's ID, key-pad information for authenticating the SUPL POS NOTIFICATION message, and mac information, etc.

In the case of the second step S738, the second SET 730 informs the N-SLP 720 of the processing result of the SUPL POS NOTIFICATION message via the SUPL POS NOTIFICATION RESP message. In this case, if the ACK mode information indicates that there is a need for the second SET 730 to transmit an acknowledgement signal, indicating the reception of the first SET 700's location information, to the first SET 700, the second SET 730 receiving the first SET 700's location information includes the acknowledgement signal in the SUPL POS NOTIFICATION RESP message, and transmits the SUPL POS NOTIFICATION RESP message including the acknowledgement signal to the N-SLP 720.

In the case of the third step S739, the N-SLP 720 transmits the SUPL POS NOTIFICATION RESP message to the H-SLP 710 via the RLP SSRP message. In this case, if the N-SLP 720 receives the acknowledgement signal from the second SET 730, it includes the acknowledgement signal into the SUPL NOTIFICATION RESP message, and transmits the SUPL NOTIFICATION RESP message including the acknowledgement signal to the H-SLP 710.

A method for transmitting the first SET 700's location information to the second SET 730 using the Standard Roaming Location Reporting Service (SRLRC) of an RLP (Roaming Location Protocol) between SLPs will hereinafter be described with reference to FIG. 7C.

Compared with the procedures of FIG. 7A, steps S754, S758, and S759 of FIG. 7C are different from steps S714, S718, and S719 of FIG. 7A, and the remaining steps of FIG. 7C are equal to those of FIG. 7A, such that only the above-mentioned steps S754, S758, and S759 of FIG. 7C will be described. For the convenience of description, it should be noted that step S754 is called a fourth step, step S758 is called a fifth step, and step S759 is called a sixth step.

In the case of the fourth step S754, the first SET 700's location information is calculated by the SET-initiated positioning procedure. If the first SET 700's location information is acquired, the H-SLP 710 transmits the RLP SRLREP (Roaming Location Protocol Standard Roaming Location Report) to the N-SLP 720 acting as the second SET's HN, and requests the N-SLP 720 to transmit the first SET 700's location information to the second SET 730.

In the case of the fifth step S758, the second SET 730 informs the N-SLP 720 of the processing result of the SUPL POS NOTIFICATION message via the SUPL POS NOTIFICATION RESP message. In this case, if the ACK mode information indicates that there is a need for the second SET 730 to transmit an acknowledgement signal, indicating the reception of the first SET 700's location information, to the first SET 700, the second SET 730 receiving the first SET 700's location information includes the acknowledgement signal in the SUPL POS NOTIFICATION RESP message, and transmits the SUPL POS NOTIFICATION RESP message including the acknowledgement signal to the N-SLP 720.

In the case of the sixth step S759, the N-SLP 720 transmits the RLP SRLRA (Roaming Location Protocol Standard Roaming Location Report Answer) message including the location-information transmission result to the H-SLP 710. In this case, if the N-SLP 720 receives the acknowledgement signal from the second SET 730, it includes the acknowledgement signal into the RLP SRLRA message, and transmits the RLP SRLRA message including the acknowledgement signal to the H-SLP 710.

Figure 8A:
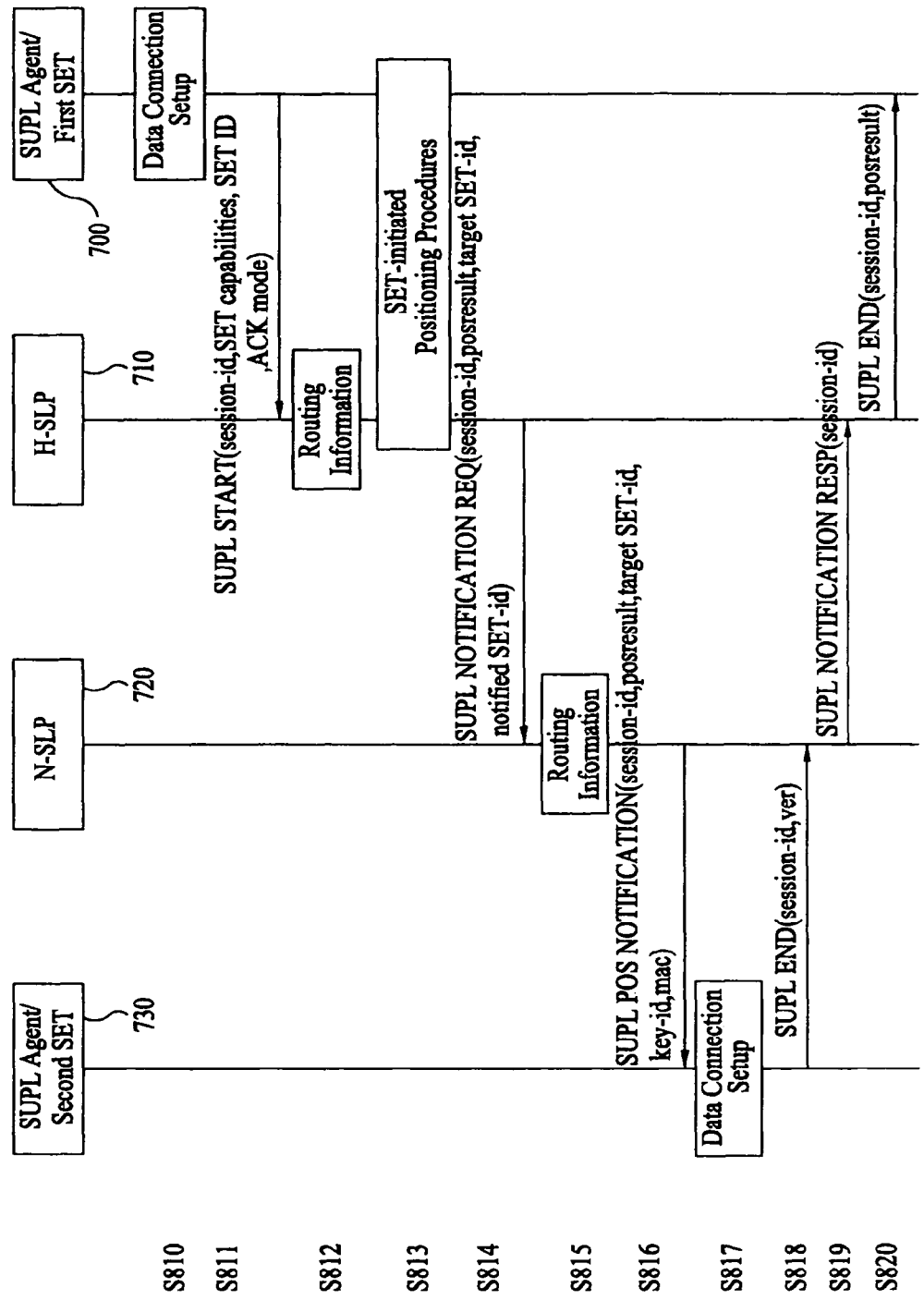
FIGS. 8A~8C are conceptual diagrams illustrating a method for transmitting location information according to a 14-th preferred embodiment of the present invention.
Figure 8B:
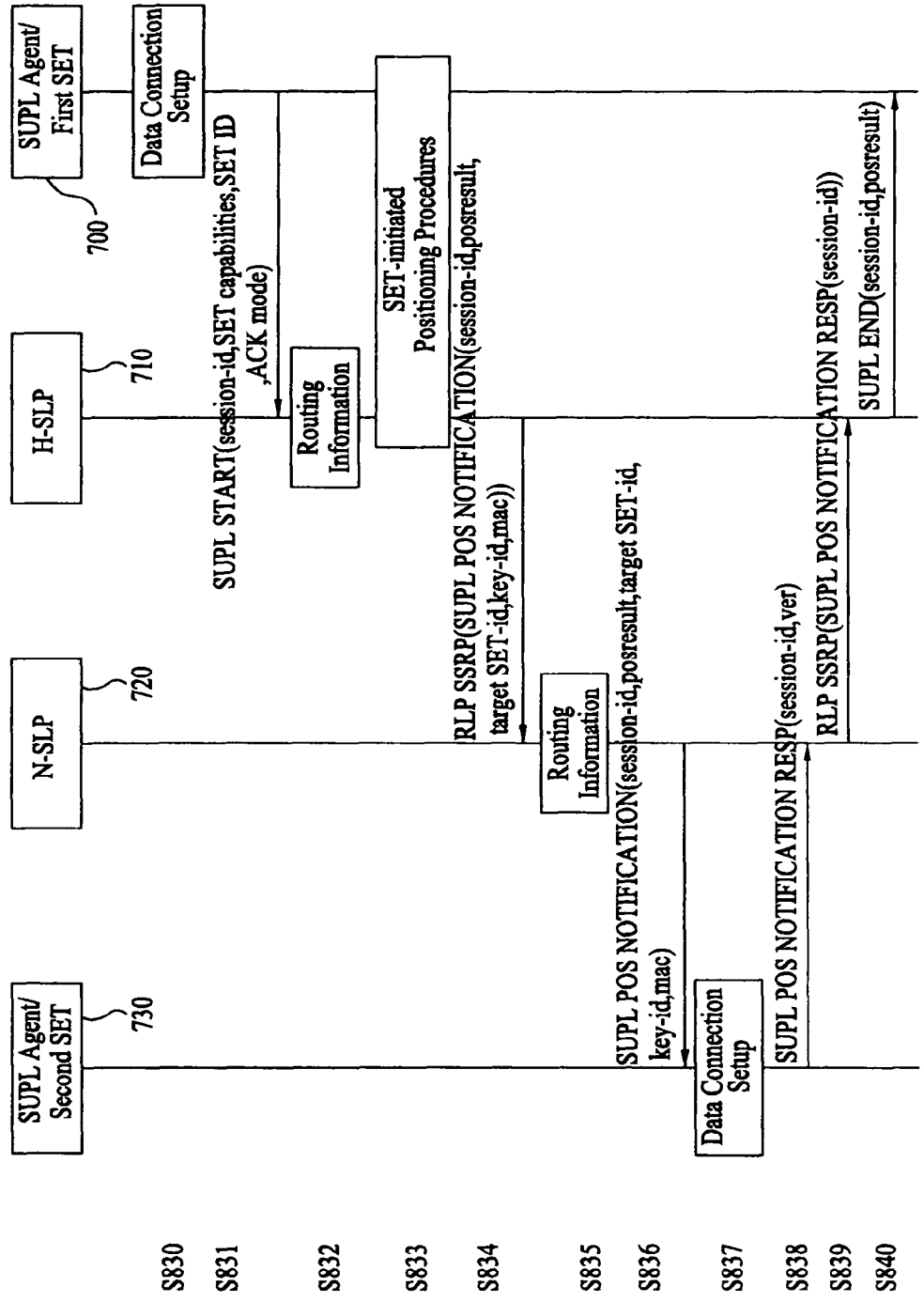
Figure 8C:
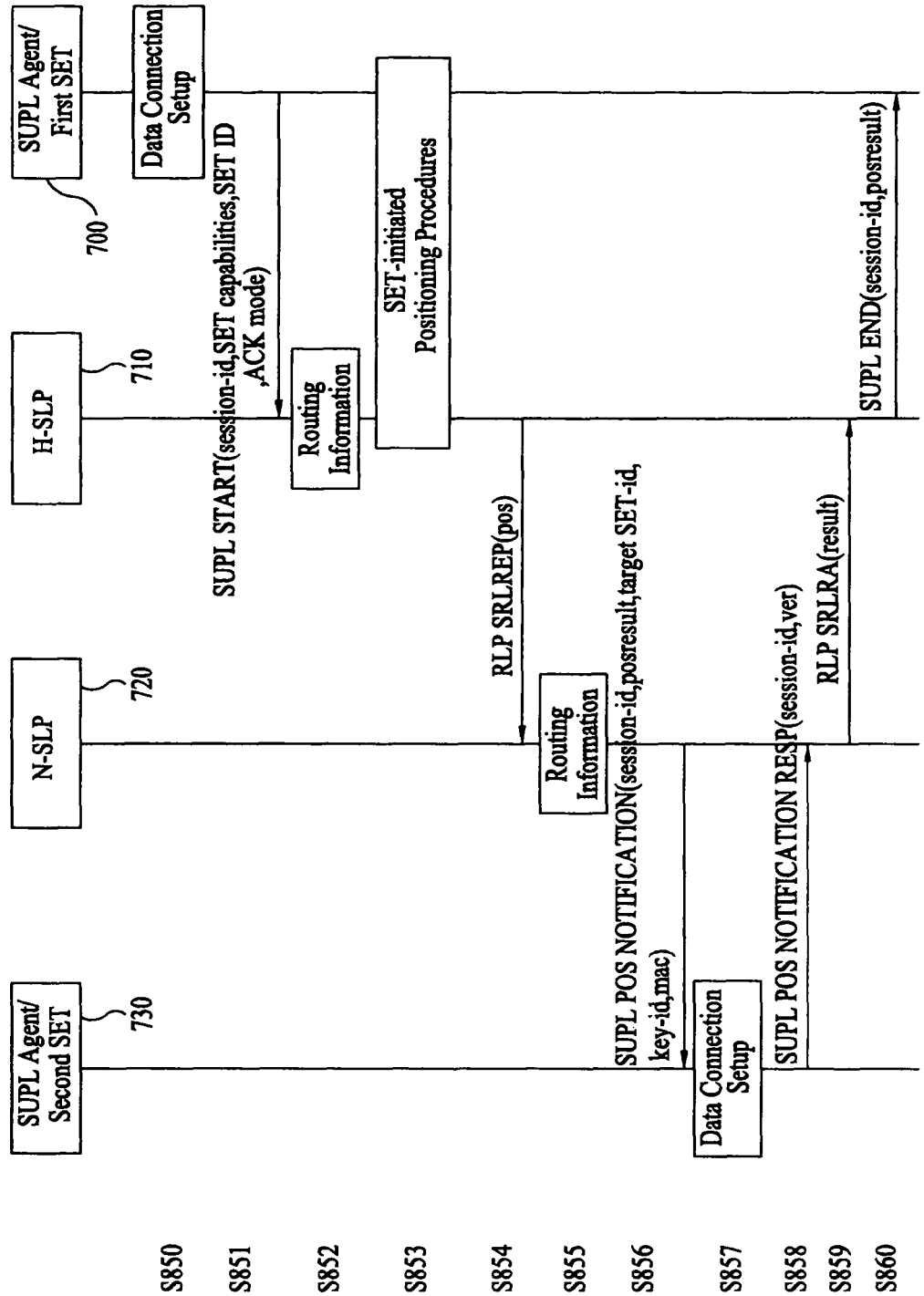

FIGS. 8A~8C are conceptual diagrams illustrating a method for transmitting location information according to a 14-th preferred embodiment of the present invention.

Compared with the location information transmission method shown in FIGS. 7A~7C, only information contained in the SUPL START message at step S811, S831, or S851 (during which the first SET 700 transmits the SUPL START message to the H-SLP 710) of FIGS. 8A~8C is different from that of FIGS. 7A~7C. Therefore, only the above steps S811, S831, and S851 of FIG. 8A~8C will be described for the convenience of description. It is obvious to those skilled in the art that a plurality of steps for the position information transmission method of FIGS. 7A~7C can also be applied to the preferred embodiment of FIGS. 8A~8C.

The first SET 700 transmits the SUPL START message to the H-SLP 710 to initiate the positioning procedure at step S811, S831, or S851. In this case, the first SET 700 requests the H-SLP 420 to transmit location information of the second SET 730, or requests the H-SLP 710 to transmit the first SET 700's location information to the second SET 730 at step S811, S831, or S851. For the above-mentioned request operations, the SUPL START message may include session-id information, lid information, qop information, SET capability information, SET ID information, and ACK mode information, etc.

For example, if the SET initiating the positioning procedure is the first SET 700 and the target SET desired by the first SET 700 is the second SET 730, a SET ID may be the second SET 730's ID. In other words, the target SET ID may be the second SET 730's ID. If the SET initiating the positioning procedure is the first SET 700 and the third party is desired by the first SET 700 as a transmission destination of the first SET 700's location information, a SET ID may be the second SET 730's ID. In other words, the third Party ID may be the second SET 730's ID.

A detailed description of messages will hereinafter be described with reference to FIGS. 9~17. The following messages can also be applied to other preferred embodiments other than the above-mentioned preferred embodiments shown in FIGS. 1A~8C.

FIG. 9 exemplarily shows a Common Part commonly contained in transmission/reception messages communicated between a terminal and a server in the case of a method for transmitting location information according to the present invention. For example, the Common Part may be considered to be a message header.

The Common Part composed of octets may include a "Message Length" parameter for indicating a total length of a ULP (User Plane Location Protocol) message; a "Version" parameter for indicating ULP protocol version information in the form of a major-, minor-, or service indicator; a "Session id" parameter for indicating a unique session ID of the message; and a "Message Payload" parameter including one of the messages prescribed in the ULP. In this case, the "Session id" parameter may include ID information of a specific SET capable of performing the positioning procedure.

Particularly, there are a variety of messages prescribed in the "Message Payload" parameter, for example, the SUPL INIT message, the SUPL START message, the SUPL RESPONSE message, the SUPL POS INIT message, the SUPL POS message, the SUPL END message, the SUPL AUTH REQ message, the SUPL AUTH RESP message, and the SUPL POS NOTIFICATION message, etc.

FIG. 10 exemplarily shows an initialization message (SUPL INIT) according to the present invention. Particularly, FIG. 10 shows the SUPL INIT message acting as the initialization message transmitted from the SLP to the first SET.

The SUPL INIT message includes a "Positioning Method" parameter, a "Notification" parameter, a "Session ID" parameter, a "QoP" parameter, an "SLP Mode" parameter, an "MAC" parameter, and a "Key Identity" parameter.

The "Positioning Method" parameter indicates positioning technologies requested by the SLP. The "Notification" parameter performs LCS notification, and transmits privacy-associated information to the SET. The "Session ID" parameter includes an SLP address. The "QoP" parameter indicates a Desired Quality of Position. The "SLP Mode" parameter indicates whether the SLP mode is the Proxy Mode or the Non-Proxy Mode. The "MAC" parameter includes a Message Authentication Code (MAC) used for Integrity Protection of the SUPL INIT message. The "Key Identity" parameter indicates identity information associated with a key used for checking the MAC.

The "Session ID" parameter includes an SPC address in the case of the Non-Proxy Mode. The "SLP Address" field serves as an optional field in the case of the Proxy Mode, but it serves as a requisite field (also called a required field) in the case of the Non-Proxy Mode. The SLP address is indicative of an address used by the SET to construct a secure IP when the SET is connected to the SLP or the SPC.

FIG. 11A shows a first preferred embodiment of a start message (SUPL START) according to the present invention. Particularly, FIG. 11A exemplarily shows the SUPL START message acting as the start message transmitted from the first SET to the SLP.

The SUPL START message may include a "SET capabilities" parameter, a "Location Id" parameter, a "QoP" parameter, a "Notified SET Id" parameter, a "MO mode" parameter, and an "ACK mode" parameter, etc. In this case, the "MO mode" parameter may be defined as a terminal start-location request mode, and the "ACK mode" parameter may be defined as a location-information acknowledgement mode.

The "SET capabilities" parameter includes a message specific part other than the common part, and indicates the capabilities of the SET. The "Location Id" parameter is indicative of cell information of the SET. The "QoP" parameter is indicative of a Desired Quality of Position. The "Notified SET Id" parameter is indicative of an ID value (Notified SET identity value) of a second SET at which the first SET's location information is to be received. The "MO mode" parameter is indicative of a location-request mode of a SET which requests the positioning service. The "MO mode" parameter indicates whether a mode type is a first type (Type 1) or a second type (Type 2). The Type-2 information may be defined as a "Transfer to the third party" type.

For example, the Type-1 information may indicate a mode in which the first SET requests its location information, and the Type-2 information may indicate a mode in which the first SET desires to transmit its location information to the second SET.

The "ACK mode" parameter indicates whether there is a need for a second SET acting as a third party to transmit an acknowledgement signal, indicating the reception of the first SET's location information, to the first SET. The "ACK mode" parameter may be an acknowledgement-requested type or an acknowledgement-unresquested type.

FIG. 11B shows a second preferred embodiment of a start message (SUPL START) according to the present invention.

Referring to FIG. 11B, the SUPL START message may include a "SET capabilities" parameter, a "Location Id" parameter, a "QoP" parameter, a "SET ID" parameter, and an "ACK mode" parameter, etc. C Compared with FIG. 11A, only the "SET ID" parameter of FIG. 11B will be described. The "SET ID" parameter may include "Target SET ID" information and "Third Party ID" information as SET ID information. If a specific SET for starting a location request action requires location information of another target SET, the "Target SET ID" information may indicate another target SET's ID. The "Third Party ID" information may indicate an ID of a third party desired by the specific SET as a transmission destination of the specific SET's location information. In this case, it should be noted that the third party is exemplarily implemented with a terminal, but it can also be implemented with other examples other than the terminal.

FIG. 11C exemplarily shows parameters of the start message (SUPL START) according to the present invention.

Referring to FIG. 11C, the "SET ID" parameter indicates that the SET ID is "SETtoSET" or "SETtoThirdParty". If the SET ID is "SETtoSET", the "SET ID" parameter includes "Target SET ID" information. If the SET ID is "SETtoThirdParty", the "SET ID" parameter may include Third Party ID information and Third Party name type information.

If the specific SET for starting a location-request action desires to receive another target SET's location information, the "Target SET ID" information may indicate another target SET's ID. In this case, another target SET may correspond to the second SET.

The "Third Party ID" parameter may indicate third party ID information. The "Third Party ID" parameter may include at least one of "Third Party Name" and "Third Party Name Type". The "Third Party Name" may indicate a third party name. The "Third Party Name Type" may indicate a type of the third party name. For example, the type of the third party name may correspond to one of Logical name, MSISDN, E-mail address, URL, SIP URL, IMS public identity, MIN, and MDN. In this case, the third party may also be implemented with the second SET as necessary.

For example, the SUPL SET INIT message has the following programming language. In this case, the "thirdPartyID" information is optional in three cases (i.e., "SETtoSET" case, "TargetSETID" case, and "SETtoThirdParty" case).

[Programming Language]

```
SUPL-INIT DEFINITIONS AUTOMATIC TAGS ::=
BEGIN
EXPORTS SUPLSETINIT;
IMPORTS SETId, FormatIndicator
FROM ULP-Components;
SUPLSETINIT ::= SEQUENCE {
SETID ::= CHOICE {
      SETtoSET           targetSETID,
      SETtoThirdPartythirdPartyID,
      ...},
      ackMode            AckMode,
      ...}
      targetSETID        SETId, --Target SETid identifies the
target SET to be located
      thirdPartyID ::= SEQUENCE {
         thirdPartyName OCTET STRING(SIZE
(1..maxThirdPartyLength)),
         thirdPartyNameType    FormatIndicator,
         ...}
      maxThirdPartyLength INTEGER ::= 50
      ACKMode ::= ENUMERATED {ackRequired (0), ackNotRequired
(1) }, ...}
      END
```

FIG. 12 exemplarily shows a response message (SUPL RESPONSE) according to the present invention. Particularly, FIG. 12 shows the SUPL RESPONSE message answering to the SUPL START message acting as the start message.

Referring to FIG. 12, the SUPL RESPONSE message includes a message specific part other than the common part. The message specific part of the SUPL RESPONSE message includes a "Positioning Method" parameter, a "SLP Address" parameter, a "SET Auth key" parameter, and a "Key Identity 4" parameter.

The "Positioning Method" parameter indicates a positioning method required for the SUPL POS session. The "SLP address" parameter is required for only the Non-Proxy Mode, and includes the SPC address. The "SET Auth key" parameter is required for only the Non-Proxy Mode, and includes an authentication key used by the SET for SPC authentication. The "Key Identity 4" parameter is required for only the Non-Proxy Mode, and includes a "Key Identity 4" parameter including key identity. The SLP address of the "SLP Address" parameter may be used when the SET establishes a data connection to the SPC.

FIG. 13 exemplarily shows a positioning initialization message (SUPL POS INIT) according to the present invention. Particularly, FIG. 13 shows the SUPL POS INIT message acting as one of the positioning initialization messages. The SUPL POS INIT message may be a message following the SUPL INIT message when the network starts operation, or may be a message following the SUPL RESPONSE message when the SET starts operation.

The SUPL POS INIT message includes a "SET capabilities" parameter, a "Requested Assistance Data" parameter, a "Location id" parameter, a "Position" parameter, a "SUPL-POS" parameter, and a "Ver" parameter, etc.

The "SET capabilities" parameter indicates SET capabilities. The "Requested Assistance Data" parameter indicates global positioning system assistance data. The "Location id"

parameter indicates cell information of the SET. The "Position" parameter indicates a SET position. The "SUPLPOS" parameter is used only when the positioning protocol allows that a first message is transmitted to the SET, and includes the SUPL POS message. The "Ver" parameter includes a hash of the SUPL INIT message. In association with the above-mentioned description, the "Ver" parameter allows the SET to calculate the hash of the SUPL INIT message under a Network-initiated Proxy Mode, and may include the hash result.

If the SUPL POS INIT message is transmitted from the first SET to the SLP, the SLP transmits/receives the positioning message to/from the first SET. If the positioning of the first SET is completed, the first SET's location information is transmitted to the second SET. The SUPL POS message acting as the positioning message will hereinafter be described.

FIG. 14 exemplarily shows a positioning message (SUPL POS) according to the present invention. Particularly, FIG. 14 exemplarily shows the SUPL POS message acting as the positioning message.

The SUPL POS message includes a "Positioning Payload" parameter and a "Velocity" parameter. The "Payload" parameter includes TIA-801, and RRLP or RRC elements. The "Velocity" parameter includes a velocity of the SET to overcome a deficiency of RRLP or RRC information. The SUPL POS message is communicated between the SLP and the first SET, resulting in the positioning of the first SET.

FIG. 15 exemplarily shows an end message (SUPL END) according to the present invention. Specifically, FIG. 15 exemplarily shows the SUPL END message. The SUPL END message indicates whether the SUPL session is normally or abnormally completed.

Referring to FIG. 15, the SUPL END message includes a "Position" parameter, a "Status Code" parameter, and a "Ver" parameter. The "Position" parameter includes specific information indicating the SET position result. The "Status Code" parameter is used for error indication or information indication, and includes specific information indicating a message status. The "Ver" parameter includes a hash of the SUPL INIT message calculated by the SET.

In the "Status Code" field, error indications may have values of 0~99, and information indications may have values of 100~199. Also, the "Ver" parameter may indicate a variety of situations generated when the SUPL END message serves as a direct response message of the SUPL INIT message under the Proxy Mode and the Non-Proxy Mode, FIG. 16 exemplarily shows an authentication response message (SUPL AUTH RESP) according to the present invention. Particularly, FIG. 16 shows an example of the SUPL AUTH RESP message.

Referring to FIG. 16, the SUPL AUTH RESP message is used for the Network-initiated cases of the Non-Proxy mode. The SUPL AUTH RESP message is transmitted from the Home SLC to the SET, and indicates the permission of the SET's SUPL-session continuation.

The SUPL AUTH RESP message includes an Authentication Key and a Key Identity used by the V-SPC, and performs tunneling to the V-SLC within the RLP message.

The SUPL AUTH RESP message includes a "SPC Auth Key" parameter, a "Key Identity 3" parameter, and a "Status Code" parameter. The "SPC Auth Key" parameter indicates an Authentication Key used when the SET authenticates the SPC. The "Key Identity 3" parameter is required when the SPC Auth key exists, and includes a key identity. The "Status Code" parameter is used for error indication or information indication, and includes specific information indicating a message status.

In the "Status Code" parameter, the error indications may have values of 0~99, and the information indications may have values of 100~199. The SUPL AUTH RESP message uses the "Status Code" parameter to indicate an authentication failure (authNetFailure).

FIG. 17 exemplarily shows a positioning notification message (SUPL POS NOTIFICATION) according to the present invention. Particularly, FIG. 17 shows an example of the SUPL POS NOTIFICATION message.

Referring to FIG. 17, the SUPL POS NOTIFICATION message acts as a message for transmitting the first SET's location information to the second SET, and includes a "Position" parameter and a "Target SET Id" parameter.

The "Position" parameter indicates the position result of the first SET. The "Target SET Id" parameter indicates the identity value of the first SET.

According to the present invention, it should be noted that the terminal can be applied to the Roaming successful case and the Non-roaming successful case irrespective of the roaming state, and the server can be applied to the Proxy Mode and the Non-Proxy Mode.

As apparent from the above description, a method for transmitting location information according to the present invention allows a specific terminal to receive its location information using a location information system, or allows the specific terminal to transmit its location information to another terminal, and defines a variety of messages for the above-mentioned operations, such that a location information service via a terminal can be effectively implemented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing location information of a first SUPL Enabled Terminal (SET) at a Home SUPL location platform (H-SLP) which is a network server to a second SET using a Secure User Plane Location (SUPL) protocol in a communication environment, the method comprising:

receiving, by the H-SLP, a SUPL START message from the first SET initiating a positioning procedure for transferring location information of the first SET to the second SET via the H-SLP, the SUPL START message including a session identifier, SET capabilities, SET-id information which is an identifier of the second SET, and mode type information which designates either one of the first SET or the second SET to receive the location information of the first SET;

transmitting, by the H-SLP, a SUPL RESPONSE message to the first SET, the SUPL RESPONSE message including the session identifier and a positioning method which is to be used for a positioning procedure between the H-SLP and the first SET;

receiving, by the H-SLP, a SUPL POS INIT message from the first SET, the SUPL POS INIT message including the session identifier and SET capabilities;

calculating the location information of the first SET through a direct connection between the H-SLP and the first SET based on the positioning method, the positioning method being one of a SET-assisted positioning method and a SET-based positioning method; transmitting, by the H-SLP, a SUPL END message to the first SET to inform the end of a SUPL session, the SUPL END message including the session identifier; and transmitting, by the H-SLP, the location information of the first SET to the second SET, after the SUPL session is finished.

2. The method of claim 1, further comprising checking a roaming state of the first SET.

3. The method of claim 1, wherein the calculation of the location information of the first SET is performed in cooperation with the first SET.

4. The method of claim 1, wherein the location information of the first SET is transmitted to the second SET via a Notified SLP (N-SLP).

5. The method of claim 1, wherein the H-SLP comprises a Home SUPL Location Center (H-SLC) and a Home SUPL Position Center (H-SPC).

6. The method of claim 5, wherein the calculation of the location information of the first SET is performed through a direct connection between the H-SPC and the first SET.

7. The method of claim 6, wherein the SUPL START message is transmitted to the H-SLC.

8. The method of claim 6, wherein the location information is transmitted to the second SET by the H-SLC.

9. The method of claim 1, wherein the first SET is in a non-roaming state in which the first SET is located at a Home Network (HN).

10. The method of claim 1, wherein the positioning method is selected based on the SET capabilities included in the SUPL START message.

11. The method of claim 1, wherein in the step of transmitting the location information of the first SET to the first SET or the second SET, the H-SLP identifies the second SET to which the location information of the first SET is to be sent by the identifier of the second SET indicated by the notified SET-id information received from the first SET, and then transmits the location information to the identified second SET.

12. A method of providing location information of a first SUPL Enabled Terminal (SET) to a second SET using a Secure User Plane Location (SUPL) protocol in a communication environment, the method comprising:

transmitting, by the first SET, a SUPL START message to a Home SUPL location platform (H-SLP) which is a network server, to initiate a positioning procedure for transferring location information of the first SET to the second SET via the H-SLP, the SUPL START message including a session identifier, SET capabilities, SET-id information which is an identifier of the second SET, and mode type information which designates either one of the first SET or the second SET to receive the location information of the first SET;

receiving, by the first SET, a SUPL RESPONSE message from the H-SLP, the SUPL RESPONSE message including the session identifier and a positioning method which is to be used for a positioning procedure between the H-SLP and the first SET;

transmitting, by the first SET, a SUPL POS INIT message to the H-SLP, the SUPL POS INIT message including the session identifier and SET capabilities;

performing a positioning procedure through a direct connection between the H-SLP and the first SET based on the positioning method to calculate the location information of the first SET, the positioning method being one of a SET-assisted positioning method and a SET-based positioning method; and receiving, by the first SET, a SUPL END message from the H-SLP, the SUPL END message including the session identifier and informing the first SET of an end of a SUPL session, wherein the location information of the first SET is transmitted by the H-SLP to the second SET.

13. The method of claim 12, wherein the calculation of the location information of the first SET is performed in cooperation with the first SET.

14. The method of claim 12, wherein the location information of the first SET is transmitted to the second SET via a Notified SLP (N-SLP).

15. The method of claim 12, wherein the H-SLP comprises a Home SUPL Location Center (H-SLC) and a Home SUPL Position Center (H-SPC).

16. The method of claim 15, wherein the calculation of the location information of the first SET is performed through a direct connection between the H-SPC and the first SET.

17. The method of claim 16, wherein the SUPL START message is transmitted to the H-SLC.

18. The method of claim 16, wherein the location information is transmitted to the second SET by the H-SLC.

19. The method of claim 12, wherein the first SET is in a non-roaming state in which the first SET is located at a Home Network (HN).

20. The method of claim 12, wherein the positioning method is selected based on the SET capabilities included in the SUPL START message.

21. The method of claim 12, wherein when providing the location information of the first SET to the second SET, the second SET to which the location information of the first SET is to be sent is first identified by the identifier of the second SET indicated by the SET-id information transmitted by the first SET, and then the location information is sent to the identified second SET.

* * * * *